United States Patent
Mori et al.

(10) Patent No.: US 8,783,813 B2
(45) Date of Patent: Jul. 22, 2014

(54) PRINTER AND NON-TRANSITORY COMPUTER-READABLE STORAGE MEDIUM STORING PRINTER CONTROL PROGRAM

(71) Applicants: Shumei Mori, Ichinomiya (JP); Yohei Kuno, Nagoya (JP)

(72) Inventors: Shumei Mori, Ichinomiya (JP); Yohei Kuno, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 14/033,806

(22) Filed: Sep. 23, 2013

(65) Prior Publication Data

US 2014/0085366 A1    Mar. 27, 2014

(30) Foreign Application Priority Data

Sep. 27, 2012   (JP) ................................. 2012-214908

(51) Int. Cl.
*B41J 2/205*   (2006.01)

(52) U.S. Cl.
USPC ............................................. 347/15; 358/1.2

(58) Field of Classification Search
CPC .................................................. B41J 2/04536
See application file for complete search history.

(56) References Cited

U.S. PATENT DOCUMENTS

| | | | |
|---|---|---|---|
| 8,360,544 B2 * | 1/2013 | Kayahara | 347/15 |
| 8,439,473 B2 * | 5/2013 | Iriguchi et al. | 347/15 |
| 8,517,494 B2 * | 8/2013 | Kakutani | 347/15 |
| 8,526,721 B2 * | 9/2013 | Yun et al. | 382/164 |
| 2009/0289990 A1 | 11/2009 | Kayanaka | |

FOREIGN PATENT DOCUMENTS

JP   2009-279888 A   12/2009

* cited by examiner

*Primary Examiner* — Lamson Nguyen
(74) *Attorney, Agent, or Firm* — Fox Rothschild LLP

(57) ABSTRACT

A printer includes a plurality of discharge control devices, a control data output device, a connection device, a connection control device, a processor and a memory. The processor performs starting output of specified print data, which is used to discharge the liquid by the discharge port group, from the control data output device to a specified discharge control device which is one of the plurality of discharge control devices that are each connected to one of the plurality of second connection ports and which is a target to perform processing that outputs print data, outputting subsequent print data, which relates is to a specified discharge target onto which the liquid is to be discharged by the discharge port group, to the specified discharge control device that is connected to the second connection port, based on the specified print data for which output has been started.

8 Claims, 12 Drawing Sheets

| PATTERN | B: PROCESSING AT S31 | C: PROCESSING AT S41 | D:COUNT OF N |
|---|---|---|---|
| 1 | IDENTIFIED | IDENTIFIED | BOTH PROCESSING AT S33 AND PROCESSING AT S43 |
| 2 | IDENTIFIED | IDENTIFIED | ONLY PROCESSING AT S33 |
| 3 | IDENTIFIED | IDENTIFIED | ONLY PROCESSING AT S43 |
| 4 | IDENTIFIED | IDENTIFIED | NO COUNT |
| 5 | IDENTIFIED | ALL | BOTH PROCESSING AT S33 AND PROCESSING AT S43 |
| 6 | IDENTIFIED | ALL | ONLY PROCESSING AT S33 |
| 7 | IDENTIFIED | ALL | ONLY PROCESSING AT S43 |
| 8 | IDENTIFIED | ALL | NO COUNT |
| 9 | ALL | IDENTIFIED | BOTH PROCESSING AT S33 AND PROCESSING AT S43 |
| 10 | ALL | IDENTIFIED | ONLY PROCESSING AT S33 |
| 11 | ALL | IDENTIFIED | ONLY PROCESSING AT S43 |
| 12 | ALL | IDENTIFIED | NO COUNT |
| 13 | ALL | ALL | BOTH PROCESSING AT S33 AND PROCESSING AT S43 |
| 14 | ALL | ALL | ONLY PROCESSING AT S33 |
| 15 | ALL | ALL | ONLY PROCESSING AT S43 |
| 16 | ALL | ALL | NO COUNT |
| 17 | NONE | IDENTIFIED | ONLY PROCESSING AT S43 |
| 18 | NONE | IDENTIFIED | NO COUNT |
| 19 | IDENTIFIED | NONE | ONLY PROCESSING AT S33 |
| 20 | IDENTIFIED | NONE | NO COUNT |
| 21 | NONE | ALL | ONLY PROCESSING AT S43 |
| 22 | NONE | ALL | NO COUNT |
| 23 | ALL | NONE | ONLY PROCESSING AT S33 |
| 24 | ALL | NONE | NO COUNT |

FIG. 12

| PATTERN | B: PROCESSING AT S31 | C: PROCESSING AT S41 | D: COUNT OF M |
|---|---|---|---|
| 1 | IDENTIFIED | IDENTIFIED | BOTH PROCESSING AT S33 AND PROCESSING AT S43 |
| 2 | IDENTIFIED | IDENTIFIED | ONLY PROCESSING AT S33 |
| 3 | IDENTIFIED | IDENTIFIED | ONLY PROCESSING AT S43 |
| 4 | IDENTIFIED | IDENTIFIED | NO COUNT |
| 5 | IDENTIFIED | ALL | BOTH PROCESSING AT S33 AND PROCESSING AT S43 |
| 6 | IDENTIFIED | ALL | ONLY PROCESSING AT S33 |
| 7 | IDENTIFIED | ALL | ONLY PROCESSING AT S43 |
| 8 | IDENTIFIED | ALL | NO COUNT |
| 9 | ALL | IDENTIFIED | BOTH PROCESSING AT S33 AND PROCESSING AT S43 |
| 10 | ALL | IDENTIFIED | ONLY PROCESSING AT S33 |
| 11 | ALL | IDENTIFIED | ONLY PROCESSING AT S43 |
| 12 | ALL | IDENTIFIED | NO COUNT |
| 13 | ALL | ALL | BOTH PROCESSING AT S33 AND PROCESSING AT S43 |
| 14 | ALL | ALL | ONLY PROCESSING AT S33 |
| 15 | ALL | ALL | ONLY PROCESSING AT S43 |
| 16 | ALL | ALL | NO COUNT |
| 17 | NONE | IDENTIFIED | ONLY PROCESSING AT S43 |
| 18 | NONE | IDENTIFIED | NO COUNT |
| 19 | IDENTIFIED | NONE | ONLY PROCESSING AT S33 |
| 20 | IDENTIFIED | NONE | NO COUNT |
| 21 | NONE | ALL | ONLY PROCESSING AT S43 |
| 22 | NONE | ALL | NO COUNT |
| 23 | ALL | NONE | ONLY PROCESSING AT S33 |
| 24 | ALL | NONE | NO COUNT |

PRINTER AND NON-TRANSITORY COMPUTER-READABLE STORAGE MEDIUM STORING PRINTER CONTROL PROGRAM

CROSS-REFERENCE TO RELATED APPLICATION

This application claims priority to Japanese Patent Application No. 2012-214908, filed Sep. 27, 2012, the content of which is hereby incorporated herein by reference in its entirety.

BACKGROUND

The present disclosure relates to a printer that performs printing based on print data, and to a non-transitory computer-readable storage medium storing a printer control program.

A printer is known that performs printing based on print data while relatively moving a carriage, on which is mounted a print head that discharges ink, with respect to a fabric held on a platen. In this type of printer, white ink and color ink are used. Generally, the base is printed using the white ink by the printer after a pretreatment liquid is applied onto the fabric by the user before printing, and printing is performed on the base using the color ink.

In the above-described printer, a processor (a CPU) that controls print processing is connected, via a bus, to a first print portion control circuit, a second print portion control circuit and a plurality of other structural elements by parallel connection. When many structural elements are connected to the processor via a bus, the number of signal lines is increased and the width of the bus is also increased. As a result, design freedom of a processing portion of the printer deteriorates. For that reason, when the CPU is connected to the first print portion control circuit and to the second print portion control circuit, it is assumed that they are serially connected via a USB hub, for example. In this type of case, print data relating to ink discharge, which is output from a drive portion that drives the print head, is transmitted from the CPU to each of the control circuits via the USB hub.

SUMMARY

However, since the print data is sequentially transmitted to the plurality of print portion control circuits from the USB hub, timings at which reception of the print data is completed by each of the print portion control circuits are not the same. Therefore, when the print portion control circuit that has completed the reception of the print data starts printing, there are cases in which at least one of the plurality of print portion control circuits has not completed the reception of the print data, or is not able to perform printing based on the received print data. If printing is started in such a state, the print processing, which is based on the premise that ink is discharged simultaneously, is not performed appropriately and there is a possibility of deterioration in print quality.

The present disclosure provides a printer and a non-transitory computer-readable storage medium storing a printer control program that are capable of inhibiting print quality from deteriorating due to a difference between timings at which liquid is discharged from each of a plurality of discharge port groups.

Various embodiments also provide a printer includes a plurality of discharge control devices, a control data output device, a connection device, a connection control device, a processor, and a memory. The plurality of discharge control devices are configured to be connected to at least one of a plurality of discharge port groups having a plurality of discharge ports capable of discharging liquid, and to control discharge of the liquid by the connected discharge port group based on print data. The print data is data to discharge the liquid by the connected discharge port group. The control data output device is configured to output the print data to each of the discharge control devices. The connection device includes a first connection port capable of connecting to the control data output device and a plurality of second connection ports that are capable of individually connecting to the at least one of the plurality of discharge port groups and that are capable of individually connecting to the first connection port such that data transmission is possible. The connection control device is configured to control data transmission between the first connection port and the plurality of second connection ports. The memory configured to store computer-readable instructions. The computer-readable instructions cause the processor to perform processes including, starting output of specified print data from the control data output device, via a connection device controlled by a connection control device, to a specified discharge control device which is one of the plurality of discharge control devices that are each connected to one of the plurality of second connection ports and which is a target to perform processing that outputs print data, the specified print data being the print data to discharge the liquid by the discharge port group connected to the specified discharge control device; and outputting subsequent print data from the control data output device, via the connection device, to the specified discharge control device that is connected to the second connection port, the subsequent print data being data relating to a specified discharge target onto which the liquid is to be discharged by the discharge port group connected to the specified discharge control device, based on the specified print data for which output has been started.

Various embodiments also provide a non-transitory computer-readable medium storing computer readable instructions that, when executed, cause a printer to perform processes including starting output of specified print data from a control data output device, via a connection device controlled by a connection control device, to a specified discharge control device which is one of a plurality of discharge control devices that are each connected to one of a plurality of second connection ports and which is a target to perform processing that outputs print data, the plurality of discharge control devices being connected to at least one of a plurality of discharge port groups having a plurality of discharge ports capable of discharging liquid, and controlling discharge of the liquid by the connected discharge port group based on the print data, the control data output device outputting the print data to each of the discharge control devices, the print data being data to discharge the liquid by the connected discharge port group, the specified print data being the print data to discharge the liquid by the discharge port group connected to the specified discharge control device, the connection device including a first connection port capable of connecting to the control data output device and the plurality of second connection ports that are capable of individually connecting to the at least one of the plurality of discharge port groups and that are capable of individually connecting to the first connection port such that data transmission is possible, and the connection control device controlling data transmission between the first connection port and the plurality of second connection ports; and outputting subsequent print data from the control data output device, via the connection device, to the specified discharge control device that is connected to the second connection port, the subsequent print data being data relating to a specified discharge target onto which the liquid is to be discharged by the discharge port group connected to the specified discharge control device, based on the specified print data for which output has been started.

BRIEF DESCRIPTION OF THE DRAWINGS

Embodiments will be described below in detail with reference to the accompanying drawings in which:

FIG. 12 is an explanatory diagram of print data transmission processing according to a modified example.

DETAILED DESCRIPTION

Figure 1:
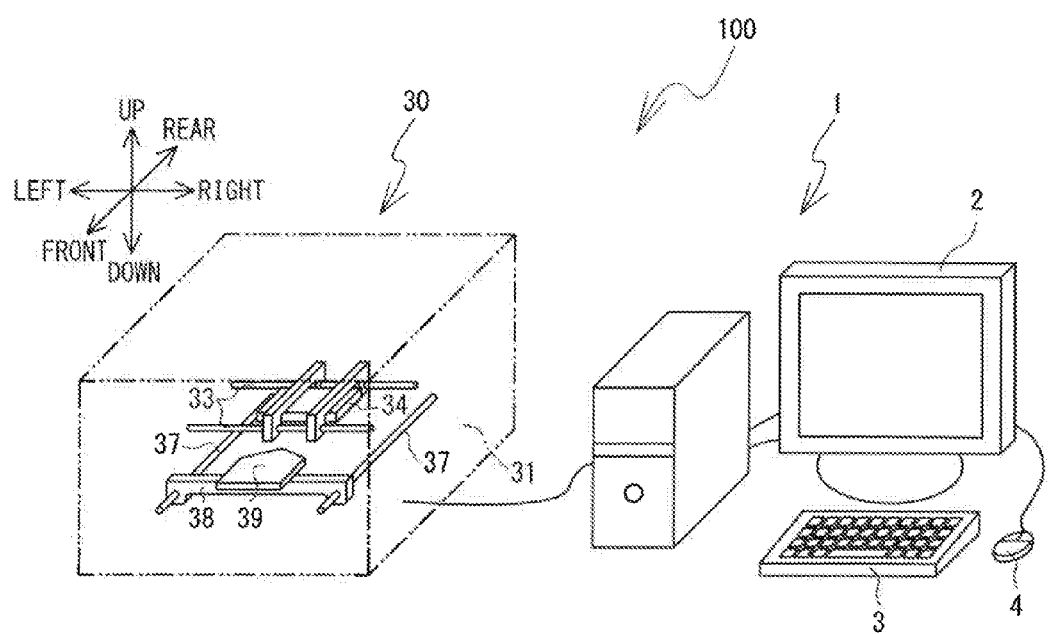
FIG. 1 is a perspective view showing a schematic configuration of a printing system 100.

Hereinafter, an embodiment of the present disclosure will be explained with reference to the drawings. Note that the drawings are used to explain technological features that can be adopted by the present disclosure, and are not intended to limit the content. First, a printing system 100, which includes a printer 30 and a personal computer (hereinafter referred to as a PC) 1 that is connected to the printer 30, will be explained with reference to FIG. 1. The printer 30 and the PC 1 are mutually connected via a cable. The printer 30 is a known inkjet printer for fabrics, and can perform printing on the fabric, which is a print medium, using print heads 35 (refer to FIG. 2). The PC 1 is a multipurpose information processing device. A monitor 2, which is a display device, and a keyboard 3 and a mouse 4, which are input devices, are connected to the PC 1. The PC 1 can generate print data, which will be described later, and can transmit the generated print data to the printer 30 via the cable. Based on the print data transmitted from the PC 1, the printer 30 can perform print processing that causes discharge port groups 361 provided on the bottom of each of the print heads 35 to discharge liquid (ink, for example).

The printer 30 will be explained with reference to FIG. 1, FIG. 2 and FIG. 3. Note that the lower left side and the upper right side of FIG. 1 respectively correspond to the front side and the back side of the printer 30. The left-right direction and the up-down direction of FIG. 1 respectively correspond to the left-right direction and the up-down direction of the printer 30.

First, a physical configuration of the printer 30 will be explained with reference to FIG. 1 and FIG. 2. As shown in FIG. 1, the printer 30 includes a housing 31 having a rectangular box shape. A pair of guide rails 37 extend in the front-rear direction in a lower portion inside the housing 31, at substantially the center in the left-right direction of the housing 31. A platen support 38 is supported by the guide rails 37 such that the platen support 38 can move in the front-rear direction (a sub-scanning direction) along the guide rails 37. A replaceable platen 39 is fixed to substantially the center, in the left-right direction, of a top surface of the platen support 38. The platen 39 is a plate member having a substantially pentagonal shape in a plan view. For example, a fabric, such as a t-shirt, can be placed on a top surface of the platen 39. Although not shown in detail in the drawings, the platen support 38, to which the platen 39 is fixed, is moved in the sub-scanning direction by a sub-scanning mechanism that includes a sub-scanning motor 56 (refer to FIG. 3) and a belt.

A pair of guide rails 33 extend in the left-right direction above the platen 39, substantially in the center of the housing 31 in the front-rear direction. A carriage 34 is supported by the guide rails 33 such that the carriage 34 can move in the left-right direction (a main scanning direction) along the guide rails 33. The plurality of print heads 35 (refer to FIG. 2) are mounted on the carriage 34. The arrangement of the plurality of print heads 35 will be described later with reference to FIG. 2. Although not shown in detail in the drawings, the carriage 34 provided with the plurality of print heads 35 is moved in the main scanning direction by a main scanning mechanism that includes a main scanning motor 83 (refer to FIG. 3) and a belt.

The configuration of the carriage 34 will be explained with reference to FIG. 2. Four print heads 35W and print heads 35C, 35M, 35Y and 35K are mounted on the carriage 34 of the present embodiment. In the description below, each of the four print heads 35W and each of the print heads 35C, 35M, 35Y and 35K will also be referred to as the print head 35. A plurality of discharge ports 36 are provided on a bottom surface of each of the print heads 35. In the present embodiment, 128 of the discharge ports 36 are provided on each of the print heads 35. FIG. 2 shows a smaller number of the discharge ports 36 than the actual number, in order to simplify the drawing. Each of the discharge ports 36 can discharge liquid. Although not shown in detail in the drawings, ink that is supplied to the print head 35 from an ink cartridge mounted on the printer 30 is discharged downward from each of the discharge ports 36 by driving a piezoelectric element that is provided on each discharge channel. Note that the ink supplied to the print head 35 may be discharged downward from the discharge ports 36 by driving a heating element or the like that is provided on each discharge channel.

The plurality of discharge ports 36 are grouped into a first unit 351 and a second unit 352. The first unit 351 includes four discharge port groups 361W that discharge a white ink for pretreatment. The four discharge port groups 361W are respectively provided on bottom surfaces of the four print heads 35W. In other words, in the present embodiment, the plurality of discharge ports 36 that are provided on the bottom surface of the individual print head 35 form one discharge port group 361. The four discharge port groups 361W (the four print heads 35W) are arranged side by side in the main scanning direction.

The second unit 352 is arranged in a position separated from the first unit 351 in the sub-scanning direction. The second unit 352 is provided with four discharge port groups 361C, 361M, 361Y and 361K that each discharge color ink for post-treatment after the discharge of the white ink for pretreatment. The four discharge port groups 361C, 361M, 361Y and 361K are respectively provided on bottom surfaces of the print heads 35C, 35M, 35Y and 35K. The four discharge port groups 361C, 361M, 361Y and 361K are arranged side by side in the main scanning direction. The discharge port group 361C discharges cyan ink. The discharge port group 361M discharges magenta ink. The discharge port group 361Y discharges yellow ink. The discharge port group 361K discharges black ink.

The white ink for pretreatment is an ink that is discharged onto a predetermined printing area before discharging the color ink. The color ink for post-treatment is an ink that is discharged onto the same predetermined printing area after the white ink for pretreatment has been discharged. In the present embodiment, the four discharge port groups 361W that discharge the white ink for pretreatment and the discharge port groups 361C, 361M, 361Y and 361K that each discharge the color ink for post-treatment are arranged separated from each other in the sub-scanning direction. For example, in the print processing that will be described later with reference to FIG. 4, the printer 30 repeats printing of one line by moving the platen 39 in the sub-scanning direction (the front-rear direction) after printing of one line in the main scanning direction (the left-right direction). In this type of print processing, the printer 30 simultaneously discharges, onto a predetermined area, the respective color inks from the four discharge port groups 361W of the first unit 351 for pretreatment and from the discharge port groups 361C, 361M, 361Y and 361K of the second unit 352 for post-treatment. The predetermined area is an area onto which the pretreatment ink has already been discharged and onto which the post-treatment ink is to be discharged. Note that the printing of one line corresponds to printing of an image that is printed by one cycle of scanning (one-pass scanning).

In the description below, the four discharge port groups 361W and the discharge port groups 361C, 361M, 361Y and 361K are also each referred to as the discharge port group 361. Further, at least one of the discharge port groups 361 having the plurality of discharge ports 36, such as the first unit 351 or the second unit 352, is also referred to as a discharge unit. In the present embodiment, each of the plurality of discharge ports 36 that are included in the same discharge port group 361 discharges ink supplied from the same ink cartridge.

Figure 2:
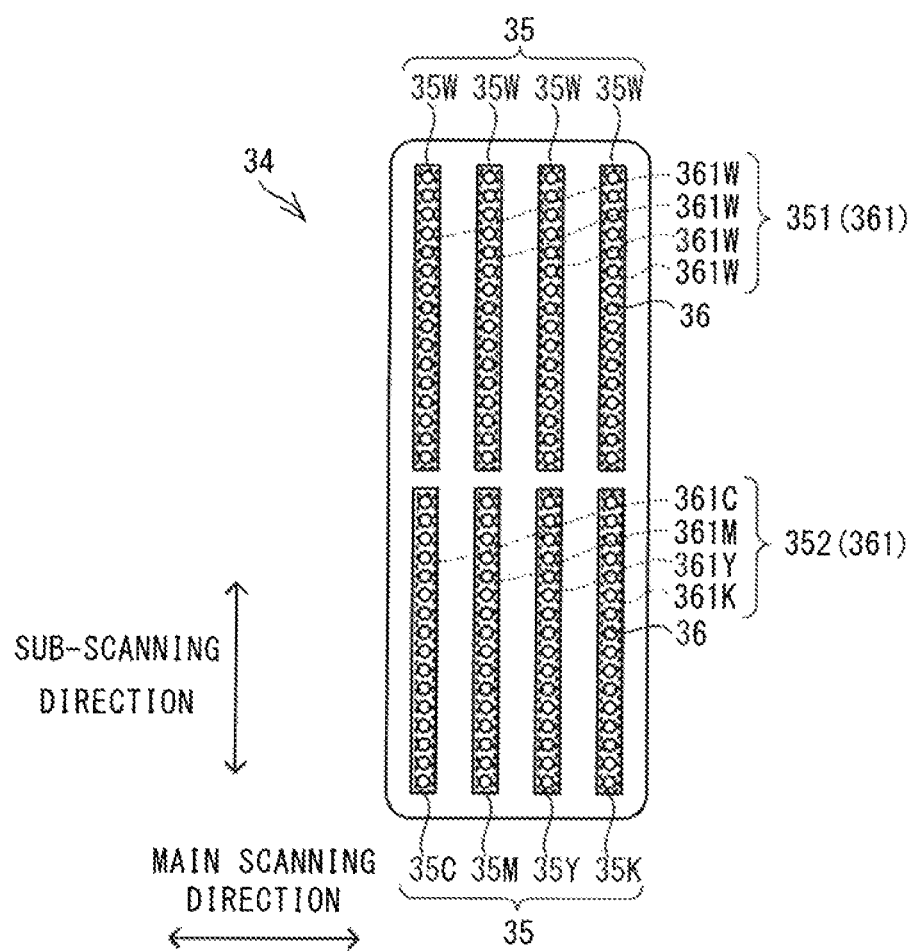
FIG. 2 is a bottom plan view showing a schematic configuration of a carriage 34.
Figure 3:
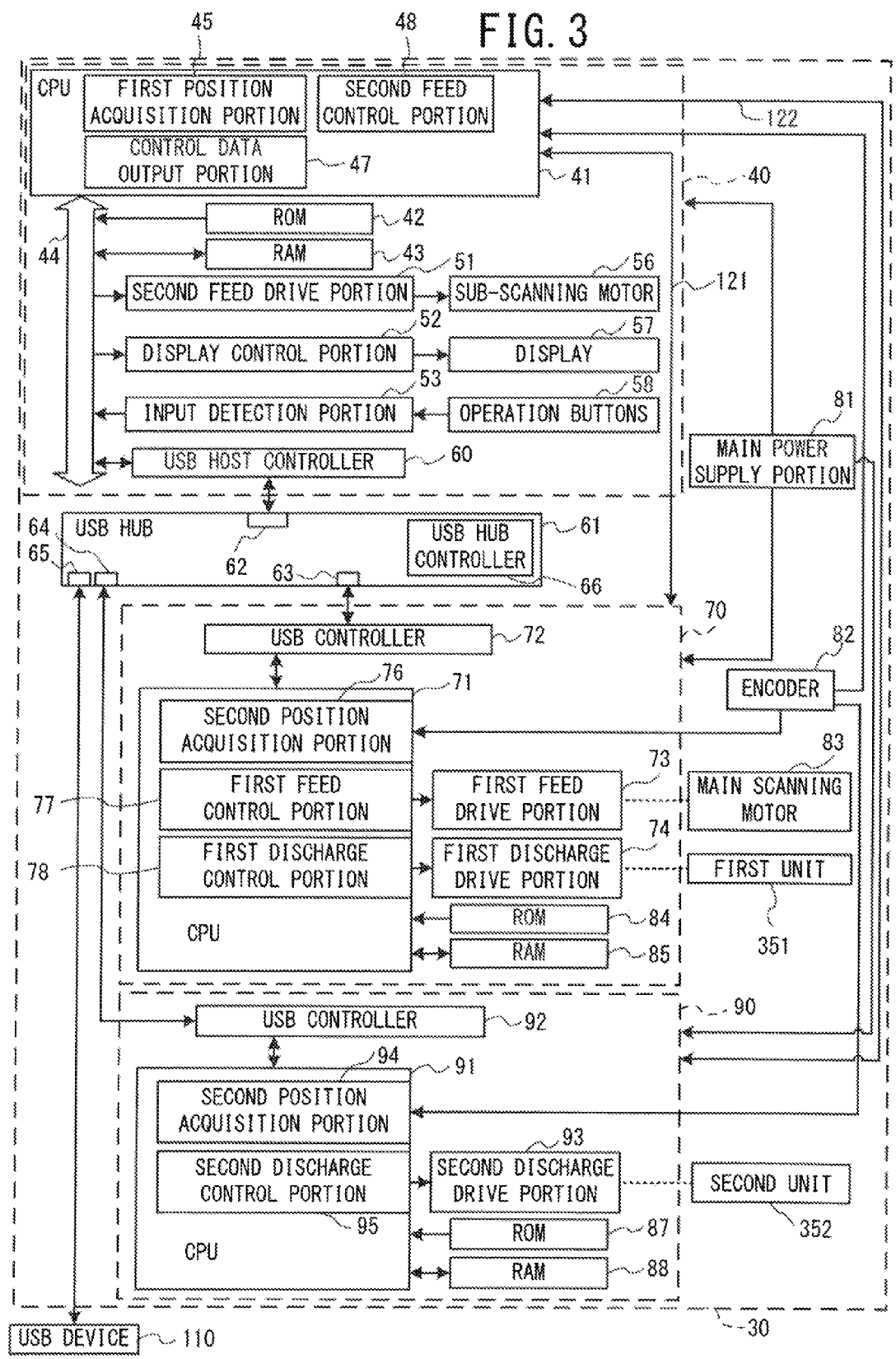
FIG. 3 is a block diagram showing an electrical configuration of a printer 30.

Note that it is sufficient that the printer 30 of the present embodiment is provided with at least two of the discharge port groups 361, and the type and the number of the discharge port groups 361 are not limited to the example shown in FIG. 2. For example, the number of the discharge port groups 361 corresponding to the white ink need not necessarily be limited to four, and may be only one. When a plurality of the discharge port groups 361 are mounted on the carriage 34 corresponding to the white ink, printing may be performed using some of the discharge port groups 361. Further, with respect to the color inks, three of the discharge port groups 361 that correspond to three colors (cyan, magenta, yellow) other than black may be provided, or one of the discharge port groups 361 that corresponds to one of the four colors (cyan, magenta, yellow and black) may be provided. The discharge port group 361 that can discharge an ink (for example, gold, silver or the like) that is other than cyan, magenta, yellow and black may be provided.

Further, with respect to the pretreatment ink and the post-treatment ink, depending on a printing image, the color ink for post-treatment need not necessarily be discharged after the white ink for pretreatment has been discharged. More specifically, there may be an area onto which only the white ink for pretreatment is discharged or an area onto which only the color ink for post-treatment is discharged. Further, in the present embodiment, the white ink is used as the pretreatment liquid, and the color inks are used as the post-treatment liquid.

However, the combination of the pretreatment liquid and the post-treatment liquid, and the liquid type etc. can be changed as appropriate, and are not limited to the case of the present embodiment. For example, a treating agent to improve fixation of the ink may be used as the pretreatment liquid, and a color ink may be used as the post-treatment liquid. For example, in discharge printing, a discharging agent may be used as the pretreatment liquid and an ink for discharge printing may be used as the post-treatment liquid. In another example, the pretreatment liquid and the post-treatment liquid may be the same type of liquid.

An electrical configuration of the printer 30 will be explained with reference to FIG. 3. The printer 30 is configured such that a first control portion 40, a second control portion 70 and a third control portion 90 are connected via a USB hub 61. The first control portion 40 is provided with a CPU 41 that performs overall control of the printer 30. The CPU 41 is a first processor provided in the printer 30. A ROM 42, a RAM 43, a second feed drive portion 51, a display control portion 52, an input detection portion 53 and a universal serial bus (USB) host controller 60 are connected to the CPU 41 via a bus 44. As will be described later, the CPU 41 functions as a first position acquisition portion 45, a control data output portion 47 and a second feed control portion 48, by executing programs stored in the ROM 42. The first position acquisition portion 45 acquires a current position of the carriage 34. The control data output portion 47 outputs print data to each of discharge control portions. The second feed control portion 48 controls the second fled drive portion 51 and thereby causes the platen 39 to move.

Various programs, such as a printing control program to control operations of the printer 30, various initial values and the like are stored in the ROM 42. Various types of data, such as print data received from the PC 1, are temporarily stored in the RAM 43. The print data of the present embodiment indicates data to discharge the white ink as well as data to discharge the color inks. The discharge of the white ink is performed by the four discharge port groups 361W of the first unit 351 that is connected to the second control portion 70. The discharge of the color inks is performed by the four discharge port groups 361C, 361M, 361Y and 361K of the second unit 352 that is connected to the third control portion 90. More specifically, the print data is known data including data that indicates a discharge amount per discharge shot and a discharge position when the white ink is discharged from each of the four discharge port groups 361W, and data that indicates a discharge amount per discharge shot and a discharge position when the color ink is discharged from each of the four discharge port groups 361C, 361M, 361Y and 361K. The discharge amount per discharge shot may be represented by two values, i.e., "1: discharge" and "2: non-discharge", or may be represented by data of three or more values. The discharge position corresponds to the current position of the carriage 34.

The second feed drive portion 51 drives the sub-scanning motor 56 that causes the platen 39 to move in the sub-scanning direction. The display control portion 52 controls display of a display 57 in accordance with an instruction from the CPU 41. The input detection portion 53 detects information and instructions that are input via operation buttons 58. Although not shown in the drawings, the operation buttons 58 include a printing start button that is used to input an instruction to start the print processing, which will be described later with reference to FIG. 4, a printing stop button that is used to input an instruction to stop the print processing, and ten-keys that are used to input values. The user can input various types of information and instructions using the operation buttons 58. The USB host controller 60 is a host controller that conforms to the USB 2.0 standard.

The USB hub 61 is connected to the USB host controller 60. The USB hub 61 is a connection device that includes a single first connection port 62, second connection ports 63 and 64, and a third connection port 65. The first connection port 62 is an upstream side port, and can be connected to the CPU 41 via the USB host controller 60 and the bus 44. The two second connection ports 63 and 64 are downstream side ports, and are respectively connected to the second control portion 70 and the third control portion 90. More specifically, the second connection port 63 can be connected to a CPU 71 via a USB controller 72. The second connection port 64 can be connected to a CPU 91 via a USB controller 92. The third connection port 65 is a downstream side port, and can be connected to a USB device 110 that is an external device. The USB device 110 is, for example, a USB flash memory and a hard disk. The USB device 110 that is connected to the third connection port 65 of the USB hub 61 can be removed from the USB hub 61. The number of the second connection ports and the third connection ports of the USB hub 61 can be changed, as appropriate, depending on the number of devices connected to the USB 61. The number of the USB devices that can be connected to the printer 30 may be changed as appropriate.

Note that, in accordance with a specification change, such as version upgrade of the printer 30, another discharge control portion that controls discharge port groups other than the eight discharge port groups 361 may be connected to the second connection ports 63 and 64. For example, in addition to the discharge port groups 361C, 361M, 361Y and 361K for discharging the color ink for post-treatment, a fourth control portion may be connected via another second connection port of the USB hub 61, in order to increase the types of the color ink for post-treatment. The fourth control portion controls a discharge port group that discharges light cyan ink, a discharge port group that discharges light magenta ink, a discharge port group that discharges yellow ink, a discharge port group that discharges black ink, and the like. Further, for example, the second control portion 70 and the third control portion 90 may be replaced with a fifth control portion and a sixth control portion, respectively, and the fifth control portion and the sixth control portion may be connected to the second connection ports of the USB hub 61. The fifth control portion controls a discharge port group that discharges a pretreatment agent for discharge printing, and the sixth control portion controls a discharge port group that discharges post-treatment color ink for discharge printing. When the functions of the printer 30 are enhanced in this manner, it is sufficient that the control portion including the corresponding discharge port group and the discharge control portion that controls the corresponding discharge port group is connected to the CPU 41 via the second connection port of the USB hub 61. Therefore, in the printer 30, modifications, such as enhancement of the functions of the printer 30, are possible without significantly changing the program etc. of the ROM 42 of the first control portion 40, and also without the user changing the printer 30 to another printer.

The USB hub 61 is provided with a USB hub controller 66. The USB hub controller 66 performs detection of the USB devices that are connected to the second connection ports 63 and 64 and to the third connection port 65, detection of a data transmission speed, conversion of the data transmission speed, data distribution, and management of the power supply to the USB devices. In accordance with an instruction from the USB host controller 60, the USB hub controller 66 connects the first connection port 62 and one of the plurality of second connection ports 63 and 64 and the third connection port 65 such that data transmission is possible. The USB hub controller 66 performs data transmission/reception between the USB host controller 60 connected to the first connection port 62 and the USB device connected to one of the plurality of second connection ports 63 and 64 and the third connection port 65.

The second control portion 70 is provided with the CPU 71, the USB controller 72, a first feed drive portion 73 and a first discharge drive portion 74 that are mounted on a system-on-a-chip (SoC). The CPU 71 is a second processor provided in the printer 30, and performs overall control of the second control portion 70 in accordance with data output from the CPU 41 and programs stored in a ROM 84, which will be described later. The CPU 71 is electrically connected to each of the USB controller 72, the first feed drive portion 73 and the first discharge drive portion 74. As will be described later, the CPU 71 executes the programs stored in the ROM 84 and thereby functions as a second position acquisition portion 76, a first feed control portion 77 and a first discharge control portion 78. The second position acquisition portion 76 acquires the current position of the carriage 34. The first feed control portion 77 controls the first feed drive portion 73 and thereby causes the carriage 34 to move. The first discharge control portion 78 controls the discharge of the white ink by the four discharge port groups 361W of the first unit 351, based on the print data output by the control data output portion 47.

The USB controller 72 is a controller that conforms to the USB 2.0 standard, and is connected to the second connection port 63 of the USB hub 61. The USB controller 72 performs data transmission/reception with the first control portion 40 that is connected to the first connection port 62 of the USB hub 61. The first feed drive portion 73 drives the main scanning motor 83 that causes the carriage 34 to move in the main scanning direction. The first discharge drive portion 74 drives a piezoelectric element (not shown in the drawings) that is provided on each of the discharge channels of the four discharge port groups 361W, and thereby causes each of the four discharge port groups 361W included in the first unit 351 to discharge the white ink. The second control portion 70 is further provided with the ROM 84 and a RAM 85 that are connected to the CPU 71. Various programs, such as a printing control program to control operations of the second control portion 70, various initial values and the like are stored in the ROM 84. Various types of data, such as print data received from the CPU 41, are temporarily stored in the RAM 85. The CPU 41 and the second control portion 70 are electrically connected via the bus 44 on the first control portion 40 side, the USB host controller 60 and the USB hub 61. Further, the CPU 41 and the second control portion 70 are directly electrically connected via a first signal line 121, without interposing another structural element.

The third control portion 90 is provided with the CPU 91, the USB controller 92 and a second discharge drive portion 93 that are mounted on a SoC other than the SoC of the second control portion 70. The CPU 91 is a third processor provided in the printer 30, and similarly to the CPU 71, the CPU 91 performs overall control of the third control portion 90 in accordance with data output from the CPU 41 and programs stored in a ROM 87, which will be described later. The CPU 91 is connected to the USB controller 92 and the second discharge drive portion 93. As will be described later, the CPU 91 executes the programs stored in the ROM 87 and thereby functions as a second position acquisition portion 94 and a second discharge control portion 95. The second position acquisition portion 94 acquires the current position of the carriage 34. The second discharge control portion 95 controls the discharge of the color inks by the four discharge port groups 361C, 361M, 361Y and 361K of the second unit 352.

The USB controller 92 is a controller that conforms to the USB 2.0 standard, and is connected to the second connection port 64 of the USB hub 61. The second discharge drive portion 93 drives a piezoelectric element (not shown in the drawings) that is provided on each of the discharge channels of the four discharge port groups 361C, 361M, 361Y and 361K, and thereby causes the four discharge port groups 361C, 361M, 361Y and 361K to discharge the color inks. Further, the third control portion 90 is provided with the ROM 87 and a RAM 88 that are connected to the CPU 91. Various programs, such as a printing control program to control operations of the third control portion 90, various initial values and the like are stored in the ROM 87. Various types of data, such as print data received from the CPU 41, are temporarily stored in the RAM 88. The CPU 41 and the third control portion 90 are connected via the bus 44 on the first control portion 40 side, the USB host controller 60 and the USB hub 61. Further, the CPU 41 and the third control portion 90 are directly connected via a second signal line 122, without interposing another structural element.

The printer 30 is further provided with a main power supply portion 81. The main power supply portion 81 supplies power to each of the first control portion 40, the second control portion 70 and the third control portion 90. More specifically, the power is supplied from the main power supply portion 81 to each of the second control portion 70 and the third control portion 90 without going through the USB hub 61. The main power supply portion 81 introduces power into the printer 30 from a commercial power supply (not shown in the drawings) via an outlet and a power cord. The main power supply portion 81 is configured such that the power supply to each of the first control portion 40, the second control portion 70 and the third control portion 90 can be shut off, if necessary. The second control portion 70 and the third control portion 90 can stably perform control of the drive portions using the power that is converted into a necessary voltage, as appropriate, and that is directly supplied from the main power supply portion 81.

The printer 30 is further provided with an encoder 82. The encoder 82 is a linear encoder that detects a pattern of encoder strips provided along a feed direction (the main scanning direction) of the carriage 34 (refer to FIG. 1), using an optical sensor fixed to the carriage 34, and outputs a pulse signal indicating a detection result. The carriage 34 is moved to one end of each of the guide rails 33 (refer to FIG. 1) by turning on the main power supply portion 81 of the printer 30. At this time, the printer 30 initializes the current position of the carriage 34. When the carriage 34 is moved on the guide rails 33 from the initial position, the encoder 82 inputs the pulse signal that is based on the detection result to each of the first position acquisition portion 45, the second position acquisition portion 76 and the second position acquisition portion 94. When the pulse signal is input from the encoder 82, the first position acquisition portion 45 updates the current position of the carriage 34. In a similar manner, when the pulse signal is input from the encoder 82, the second position acquisition portions 76 and 94 update the current position of the carriage 34.

Next, the print processing that is performed by the printer 30 will be briefly explained with reference to FIG. 4. After the print data has been received from the PC 1, when the user places a fabric on the platen 39 and depresses the printing start button, the printer 30 of the present embodiment starts the print processing. The print data may be acquired from another external device, such as the USB flash memory that is the USB device 110. The print processing is executed by the CPU 41, the CPU 71 and the CPU 91 operating in cooperation with each other in accordance with the programs that are respectively stored in the ROM 42, the ROM 84 and the ROM 87.

Figure 4:
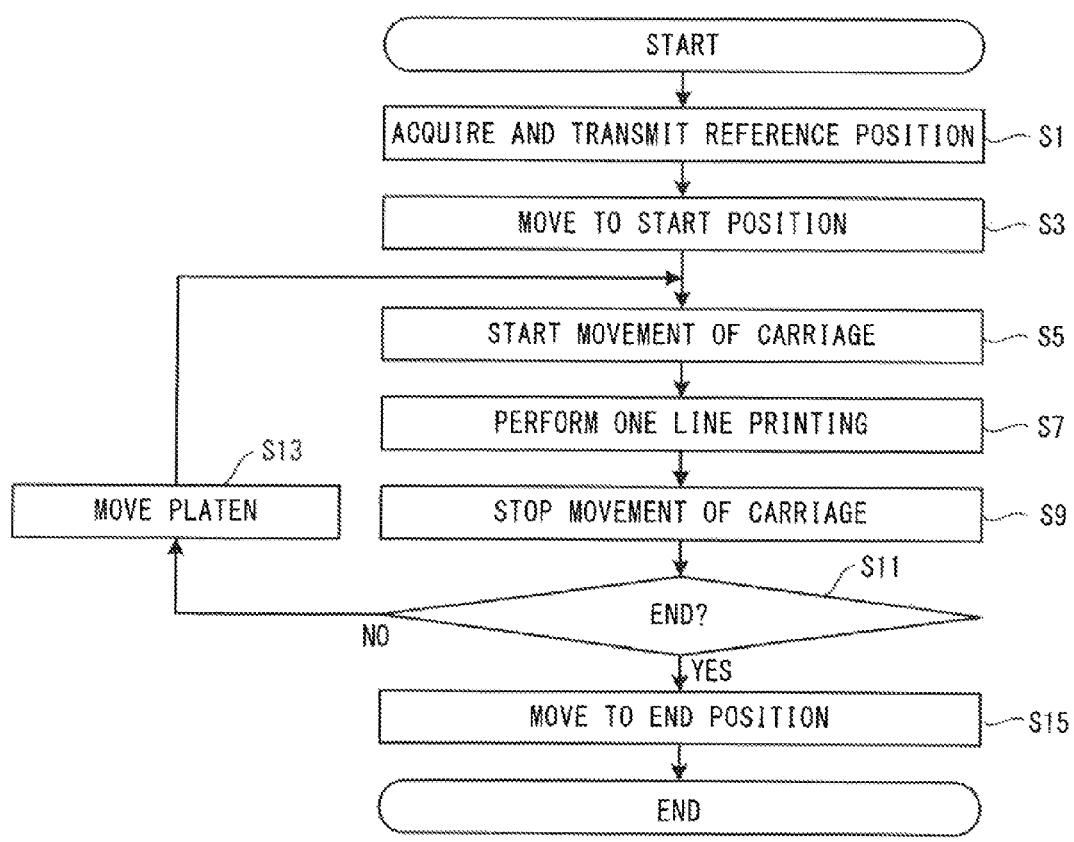
FIG. 4 is a flowchart of print processing.

As shown in FIG. 4, in the print processing, first, the CPU 41 (the first position acquisition portion 45) acquires, as a reference position, the current position of the carriage 34 that is stored in a register of the first acquisition portion 45. Then, the CPU 41 outputs the acquired reference position to the second control portion 70 and the third control portion 90 via the USB hub 61 (step S1). The second position acquisition portion 76 of the second control portion 70 and the second position acquisition portion 94 of the third control portion 90 that have received the reference position respectively update the current position of the carriage 34.

Next, the CPU 41 (the second feed control portion 48) outputs an instruction to the second feed drive portion 51 and causes the platen 39 to move in the sub-scanning direction so that the discharge port groups 361 that discharge the white ink are in a printing start position on the feed path (step S3). The CPU 71 (the first feed control portion 77) drives the first feed drive portion 73 based on an instruction from the CPU 41, and causes the carriage 34 to move in the main scanning direction to the start position (step S3). Next, the printer 30 starts processing that moves the carriage 34 in the main scanning direction (step S5). The instruction to start the processing at step S5 is output by the CPU 41 to the CPU 71 (the first feed control portion 77) of the second control portion 70 via the USB hub 61. The CPU 71 (the first feed control portion 77) that has received the instruction controls the first feed drive portion 73, starts feed control of the carriage 34, and causes the carriage 34 to move at a certain speed.

Next, the printer 30 performs printing of one line while moving the carriage 34 in the main scanning direction (step S5, step S7). Immediately after the start of the printing, the discharge of the white ink only is performed by the discharge port groups 361W in accordance with data of white (W) in the print data (CMYKW). When the discharge port groups 361C, 361M, 361Y and 361K are moved to an area onto which the white ink has been discharged by the discharge port groups 361W, the discharge of the white ink and the discharge of the color inks are performed in parallel while the carriage 34 is being moved in the main scanning direction. The discharge of the white ink is performed by the discharge port groups 361W in accordance with the data of white (W) in the print data (CMYKW). The discharge of the color inks is performed by the discharge port groups 361C, 361M, 361Y and 361K in accordance with data of colors (CMYK) in the print data (CMYKW). Immediately before the end of the printing, the discharge of the white ink is completed, and the discharge of the color inks only is performed by the discharge port groups 361C, 361M, 361Y and 361K in accordance with the data of the colors (CMYK) in the print data (CMYKW).

When performing the processing at step S7, the CPU 41 (the control data output portion 47) divides and outputs the print data, a plurality of times, to each of the CPU 71 (the first discharge control portion 78) of the second control portion 70 and the CPU 91 (the second discharge control portion 95) of the third control portion 90 via the USB hub 61, as will be described later with reference to FIG. 5. Further, the CPU 41 (the control data output portion 47) outputs a discharge permission signal that corresponds to the print data to each of the CPU 71 (the first discharge control portion 78) of the second control portion 70 and the CPU 91 (the second discharge control portion 95) of the third control portion 90 via the signal lines 121 and 122. The discharge permission signal is a signal that permits discharge processing to be started based on the print data. The discharge processing is processing that discharges liquid based on the print data. As will be described later with reference to FIG. 8, each of the CPU 71 (the first discharge control portion 78) and the CPU 91 (the second discharge control portion 95) receives the print data and the discharge permission signal output from the CPU 41. Each of the CPU 71 (the first discharge control portion 78) and the CPU 91 (the second discharge control portion 95) controls processing that discharges ink from the discharge ports 36 to the discharge position that is specified by the print data, based on the print data corresponding to the received discharge permission signal and on the current position of the carriage 34 acquired by the second position acquisition portions 76 and 94.

The reference positions of the second position acquisition portions 76 and 94 are matched by the processing at step S1. Further, as will be described later with reference to FIG. 6, each of the second position acquisition portions 76 and 94 updates the current position of the carriage 34 based on the detection signal input from the same encoder 82. Therefore, by determining the discharge position based on the current position of the carriage 34 acquired by the second position acquisition portions 76 and 94, the discharge processing of the white ink that is performed by the second control portion 70 is synchronized with the discharge processing of the color inks that is performed by the third control portion 90.

The reason that the start of the discharge processing is controlled using the discharge permission signal is as follows. The second control portion 70 and the third control portion 90 can respectively determine ink discharge timings using the second position acquisition portions 76 and 94 with which they are provided. Therefore, each of the second control portion 70 and the third control portion 90 can independently perform the discharge processing. On the other hand, the print data is output to each of the second control portion 70 and the third control portion 90 via the USB hub 61. Therefore, timings at which the second control portion 70 and the third control portion 90 receive the print data are different from each other. Thus, a situation can occur in which even when one of the control portions has not received the print data and cannot perform the discharge processing, the other control portion has received the print data and can perform the discharge processing based on the received print data. As described above, there are cases in which the printer 30 of the present embodiment performs the processing that discharges the color ink and the white ink in a same period. If a situation occurs in which one of the color ink and the white ink, both of which are originally to be discharged in the same period, is not discharged, print quality deteriorates. In contrast to this, the printer 30 uses the discharge permission signal to control the start of the discharge processing based on the print data so that the color ink and the white ink are both discharged in the same period based on the print data. With this type of processing, the printer 30 avoids a situation in which only one of the white ink and the color ink is discharged. Note that, in the processing at step S5, when printing of the second line onward is performed, the CPU 41 confirms that the discharge permission signal is received by each of the discharge control portions 78 and 95 from the control data output portion 47, and after that, outputs an instruction to start the movement of the carriage 34 to the CPU 71 (the first feed control portion 77). In this manner, the printer 30 avoids the situation in which the movement of the carriage 34 is started without receiving the discharge permission signal and the white ink and the color ink are not both discharged.

Note that the period included in the "same period" indicates a period in which a difference between the discharge timings is within a time period P(s). The time period P is calculated, for example, by Formula (1) that is based on a resolution of an image and a feed speed of the carriage 34.

$$P = 1/\text{resolution} \times 25.4 \times \tfrac{1}{2} \times \text{feed speed of the carriage 34 (mm/s)} \quad \text{Formula (1)}$$

For example, when the resolution of an image is 600 dpi, 600 dots of droplets are discharged in 25.4 mm (1 inch). In this case, 1/resolution×25.4 is a distance Q between the centers of each of the dots. An upper limit of the range of the same period is a value obtained by dividing the distance ½Q by the feed speed (mm/s) of the carriage 34.

After step S7, the CPU 71 (the first feed control portion 77) of the second control portion 70 controls the first feed drive portion 73 and stops the movement of the carriage 34 (step S9). Next, when the printing is not completed (no at step S11), the CPU 41 (the second feed control portion 48) outputs an instruction to the second feed drive portion 51 and causes the platen 39 to move by an amount corresponding to a printing method (step S13). The processing returns to step S5. Examples of the printing method include a method that uses a multi-pass system and a method that uses a single-pass system. The multi-pass system is a system that performs printing by scanning the print head 35 a plurality of times in the same area so that one pixel column is formed by the different discharge ports 36 of the same print head 35 (the discharge port group 361) with respect to each of pixel columns. The single-pass system is a system that performs printing by scanning the same print head 35 once for each of the pixel columns. When the printing is completed (yes at step S11), the CPU 41 (the second feed control portion 48) outputs an instruction to the second feed drive portion 51 and causes the platen 39 to move forward to a position where the fabric can be removed. The CPU 71 (the first feed control portion 77) drives the first feed drive portion 73 based on the instruction from the CPU 41 and causes the carriage 34 to move to an end position (step S15). The print processing thus ends.

Note that, as explained in the above-described print processing, the printer 30 of the present embodiment causes the carriage 34 to move in the main scanning direction and also causes the platen 39 to move in the sub-scanning direction. Thus, the printer 30 causes the carriage 34 to move relatively with respect to the platen 39 (the print medium placed on the platen 39). However, it is sufficient that the printer 30 can move the carriage 34 relatively with respect to the platen 39, and a specific feed method is not limited to the method of the present embodiment. More specifically, it is possible to adopt a method in which the platen 39 is moved in the main scanning direction and the carriage 34 is moved in the sub-scanning direction, a method in which the platen 39 only is moved in the main scanning direction and the sub-scanning direction, and a method in which the carriage 34 only is moved in the main scanning direction and the sub-scanning direction.

Next, print data output processing will be explained with reference to FIG. 5. The print data output processing shown in FIG. 5 is processing which is executed by the CPU 41 and which is included in the processing at step S7 shown in FIG. 4 that is executed by the CPU 41, the CPU 71 and the CPU 91 operating in cooperation with each other. Specifically, in the print data output processing shown in FIG. 5, the CPU 41 performs processing that outputs the print data and the discharge permission signal to each of the discharge control portions. The print data output processing is started when the printer 30 receives the print data from the PC 1 similarly to the print processing shown in FIG. 4, and is performed by the CPU 41 (the control data output portion 47) in accordance with the printing control program stored in the ROM 42. Note that it is assumed that data, variables, setting values and the like that are acquired in the course of the processing are stored in the RAM 43 as appropriate.

Figure 5:
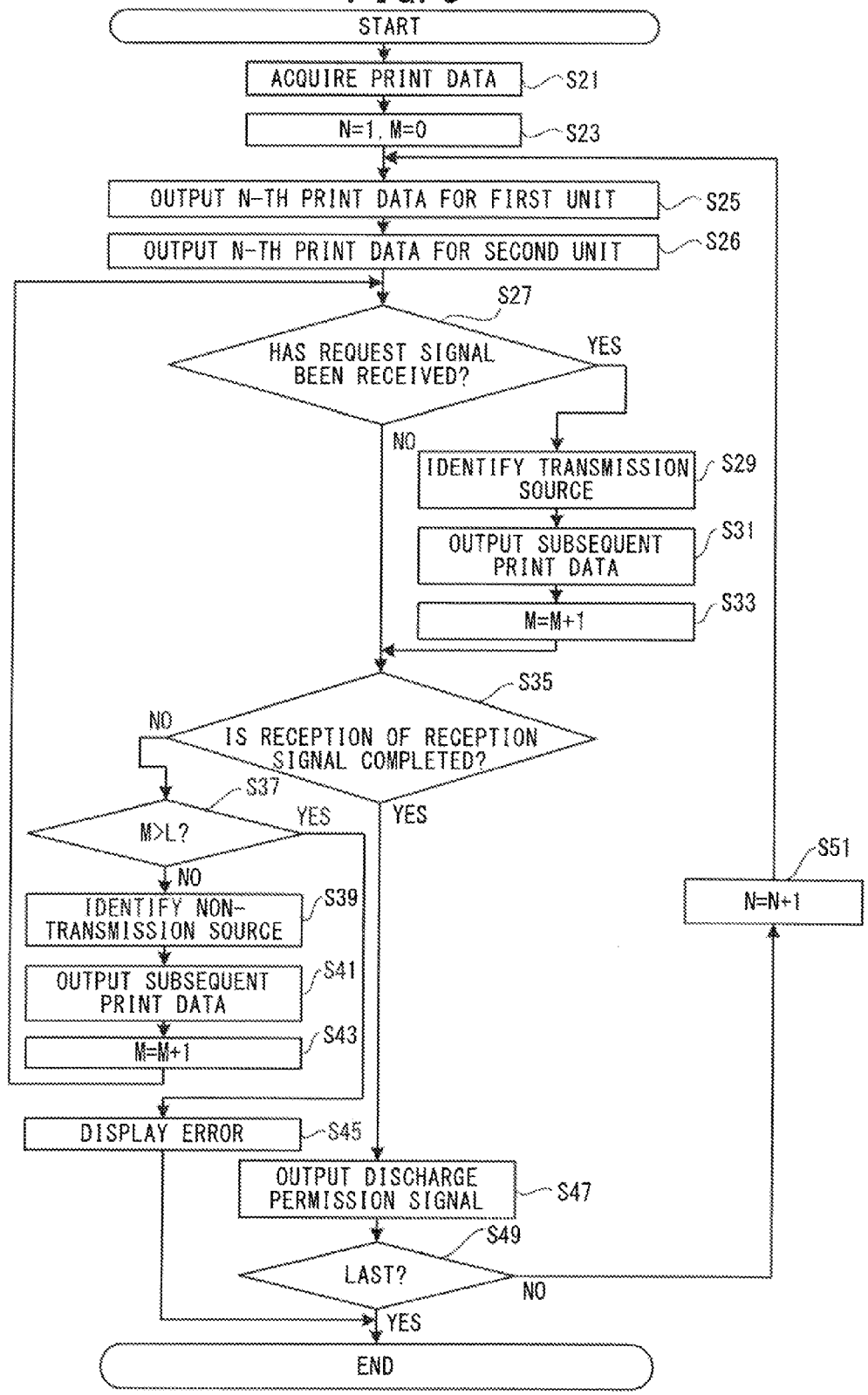
FIG. 5 is a flowchart of print data output processing.

As shown in FIG. 5, the CPU 41 acquires the print data received from the PC 1 and stores the print data in the RAM 43 (step S21). It is assumed that the print data is generated on the PC 1 by an instruction from the user. Next, the CPU 41 sets a variable N to 1 and sets a variable M to 0 (step S23). The variable N is used to read out the print data sequentially in a printing order, and the variable M is used to count the number of times of retransmission of the print data. The CPU 41 divides and outputs the print data, a plurality of times, to the second control portion 70 and the third control portion 90. The amount of print data that is output each time is determined in advance and stored in a nonvolatile storage device, such as the ROM 42. In the present embodiment, the amount of print data that is output each time is print data corresponding to three lines. The amount of print data that is output each time may be changed as appropriate.

Next, from among the print data stored in the RAM 43, the CPU 41 acquires N-th print data for the four discharge port groups 361W of the first unit 351. The CPU 41 outputs the acquired print data, as specified print data, to the first discharge control portion 78 of the second control portion 70 via the bus 44, the USB host controller 60 and the USB hub 61 (step S25). The specified print data is print data to discharge liquid by the discharge unit that is connected to a specified discharge control portion that is a discharge control portion set as a target to which the print data is to be output. The specified discharge control portion in the processing at step S25 is the first discharge control portion 78 of the second control portion 70. The print data corresponding to three lines, for example, is output by the processing at step S25. When the specified print data is output, data indicating the following items, for example, may be added in addition to data indicating an output destination. When the print data for which the variable N is 1 is output, data is added relating to the size (data size) of all the print data for the first unit 351 that is necessary to form one image by the print processing. In print data reception processing that will be described later, this data is referred to in processing that determines whether or not all the print data has been received. Further, data representing the variable N is added. This data is used to determine whether or not the print data is output in the printing order.

After the print data has been output to the first discharge control portion 78 of the second control portion 70, the CPU 41 (the control data output portion 47) acquires N-th print data for the four discharge port groups 361C, 361M, 361Y and 361K of the second unit 352, from among the print data stored in the RAM 43. The CPU 41 (the control data output portion 47) outputs the acquired print data, as specified print data, to the second discharge control portion 95 of the third control portion 90 via the bus 44, the USB host controller 60 and the USB hub 61 (step S26). The specified discharge control portion in the processing at step S26 is the second discharge control portion 95 of the third control portion 90. The print data corresponding to, for example, three lines (the same amount as in the processing at step S25) is output by the processing at step S26. Data to be added when the specified print data is output, such as data relating to the size of all the print data for the second unit 352, is similar to that described in the processing at step S25.

Next, the CPU 41 determines whether or not a request signal has been received (step S27). As will be described later with reference to FIG. 8, when proper print data cannot be received, each of the second control portion 70 and the third control portion 90 transmits a request signal to the CPU 41. The request signal includes data indicating that this signal is a request signal and data indicating a transmission source (the second control portion 70 or the third control portion 90) of the request signal. The printer 30 performs processing that confirms whether or not the request signal has been received, and thereby avoids a situation in which the discharge processing is not performed appropriately due to the fact that the print data has not been received properly. When the request signal has been received (yes at step S27), the CPU 41 identifies the transmission source based on the received request signal (step S29), and outputs subsequent print data to the identified transmission source (step S31). The subsequent print data is data relating to a specified discharge target onto which liquid is discharged by the discharge port group 361 based on the specified print data. The specified print data is data whose output is started at step S25 or step S26. The discharge port group 361 is electrically connected to the first discharge control portion 78 of the second control portion 70 or to the second discharge control portion 95 of the third control portion 90. The specified discharge target of the present embodiment is a printed result by the white ink or a printed result by the color ink corresponding to three lines that is discharged based on the specified print data whose output is started at step S25 or step S26. Both the specified print data and the subsequent print data are print data. The subsequent print data indicates data whose output is started after the output of the specified print data has been started. The specified print data is output to the specified discharge control portion. The subsequent print data also includes print data that is output not only to the specified discharge control portion but also to the other discharge control portion.

When the transmission source identified at step S29 is the second control portion 70, the subsequent print data in the processing at step S31 is the N-th print data for the first unit 351 output in the processing at step S25. When the transmission source is the third control portion 90, the subsequent print data in the processing at step S31 is the N-th print data for the second unit 352 output in the processing at step S26. More specifically, in the processing at step S31, the N-th print data is output again to the second control portion 70 or the third control portion 90 that has failed to properly receive the N-th print data output in the processing at step S25 or step S26. Next, the CPU 41 increments the variable M (step S33).

When the request signal has not been received (no at step S27), or after the processing at step S33, the CPU 41 determines whether or not the reception of a reception signal is completed (step S35). As will be described later with reference to FIG. 6, when the print data has been received properly, each of the second control portion 70 and the third control portion 90 transmits a reception signal to the CPU 41. The reception signal includes data indicating that this signal is a reception signal and data indicating a transmission source (the second control portion 70 or the third control portion 90) of the reception signal. The printer 30 may employ, as a reception signal, a handshake packet that is transmitted from the USB controllers 72 and 92 of the second control portion 70 and the third control portion 90 to the USB host controller 60 of the first control portion 40. In this case, when the USB host controller 60 receives a handshake packet whose status code is ACK (acknowledge), it is determined that the reception signal has been received. This determination is made because the USB protocol requires that, when data is received without an error, the device that has received the data returns the handshake packet whose status code is set to ACK. It is needless to mention that the printer 30 may transmit a reception signal from the second control portion 70 and the third control portion 90 to the first control portion 40, separately from the handshake packet. When the reception signal has been received, the CPU 41 stores the received reception signal in the RAM 43. When the reception signal has not been received from both the second control portion 70 and the third control portion 90 within a predetermined time period after the N-th print data has been output, the CPU 41 determines that the reception of the reception signal is not completed (no at step S35). The elapsed time period from the output of the N-th print data is measured by timer processing (not shown in the drawings).

In this case, the CPU 41 determines whether or not the variable M is larger than a constant L (step S37). The constant L is a value that is set in advance to limit the number of times of retransmission of the N-th print data. The constant L is set in advance considering the frequency of occurrence of a situation in which the print data is not received properly, the size of the N-th print data, the capacity of data buffers of the USB controllers 72 and 92, the time required to output the print data, and the like, and may be stored in a nonvolatile storage device, such as the ROM 42. The constant L is 5, for example. When the variable M is larger than the constant L (yes at step S37), the CPU 41 outputs an instruction to the display control portion 52 so that an error is displayed on the display 57 (step S45), and thus terminates the print data output processing. In the processing at step S45, the printer 30 may output an instruction to the PC 1 and cause the monitor 2 of the PC 1 to display the error. When the variable M is smaller than the constant L (no at step S37), the CPU 41 identifies a non-transmission source of the reception signal by referring to the RAM 43 (step S39). Note that the transmission source can be identified because the reception signal transmitted from the second control portion 70 or the third control portion 90 includes data about the transmission source of the reception signal, as will be described later. The non-transmission source is at least one of the second control portion 70 and the third control portion 90 that has not transmitted the reception signal within the predetermined time period after the CPU 41 has output the N-th print data. The CPU 41 identifies the non-transmission source by referring to the transmission source of the reception signal stored in the RAM 43. Next, the CPU 41 outputs the subsequent print data to the non-transmission source identified by the processing at step S39 (step S41). When the non-transmission source identified at step S39 is the second control portion 70, the subsequent print data in the processing at step S41 is the N-th print data for the first unit 351 output in the processing at step S25. When the non-transmission source is the third control portion 90, the subsequent print data in the processing at step S41 is the N-th print data for the second unit 352 output in the processing at step S26. More specifically, in the processing at step S41, the N-th print data is output again to the second control portion 70 or the third control portion 90 that has failed to transmit the reception signal corresponding to the N-th print data output in the processing at step S25 or step S26. Next, the CPU 41 increments the variable M (step S43) and the processing returns to step S27.

When the reception signal has been received from both the second control portion 70 and the third control portion 90 within the predetermined time period after the CPU 41 has output the N-th print data, the CPU 41 determines that the reception of the reception signal is completed (yes at step S35). In this case, the CPU 41 outputs a discharge permission signal corresponding to the N-th print data to the second control portion 70 and the third control portion 90 via the signal lines 121 and 122, respectively (step S47). Since the discharge permission signal is output via the signal lines 121 and 122, the second control portion 70 and the third control portion 90 receive the discharge permission signal at almost the same time. In the present embodiment, each of the first discharge control portion 78 of the second control portion 70 and the second discharge control portion 95 of the third control portion 90 does not start the discharge processing based on the N-th print data until the discharge permission signal corresponding to the N-th print data is received. Next, the CPU 41 determines whether or not the print data which is last in the printing order has been output (step S49). When all the print data acquired at step S21 has not been output (no at step S49), the CPU 41 increments the variable N (step S51). Next, the processing returns to step S25. When all the print data acquired at step S21 has been output (yes at step S49), the print data output processing is terminated. Note that, when the N-th print data is output as the specified print data at step S25 and step S26 that are repeatedly performed, (N+1)-th print data to be output at steps S25 and S26 of the next cycle is the specified print data and is also the subsequent print data with respect to the N-th print data.

Figure 6:
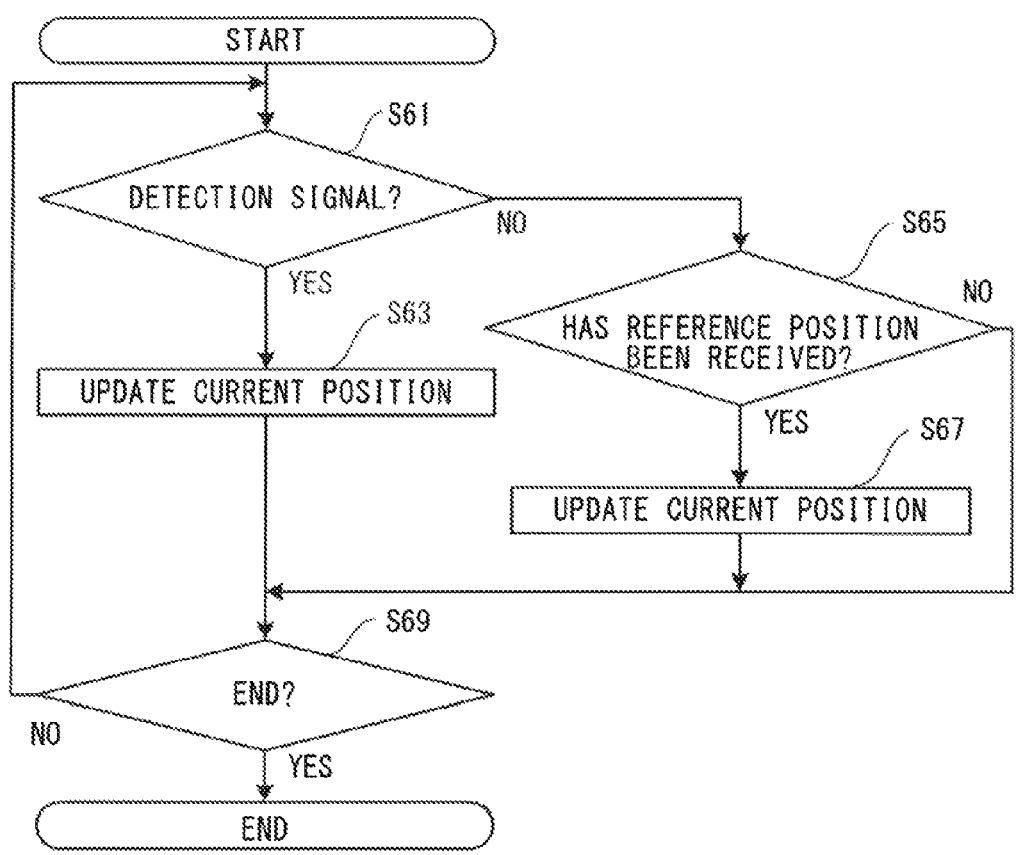
FIG. 6 is a flowchart of position acquisition processing.
Figure 7:
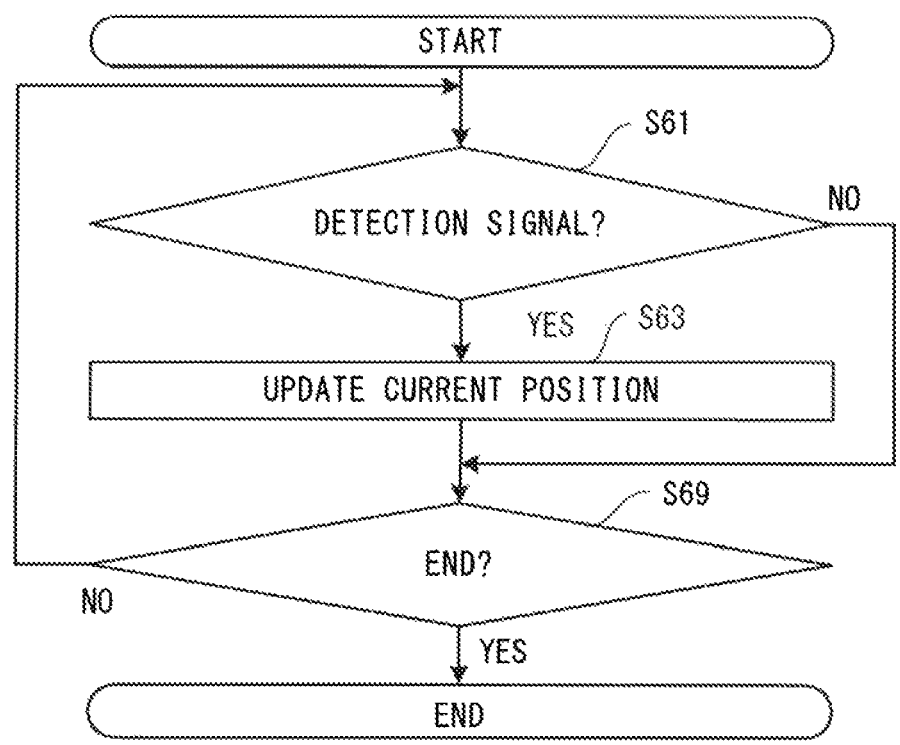
FIG. 7 is a flowchart of position acquisition processing.

Next, position acquisition processing, which is performed by each of the first control portion 40, the second control portion 70 and the third control portion 90, will be explained with reference to FIG. 6 and FIG. 7. The position acquisition processing shown in FIG. 6 and FIG. 7 is processing that acquires the current position of the carriage 34 in each of the first control portion 40, the second control portion 70 and the third control portion 90, in order for the CPU 41, the CPU 71 and CPU 91 to perform the processing at step S7 in FIG. 4 while operating in cooperation with each other. In FIG. 6 and FIG. 7, when the same processing is performed, the same step number is assigned. The position acquisition processing in the second control portion 70 is performed by the CPU 71 (the second position acquisition portion 76) when activation processing of the carriage 34 is completed. The position acquisition processing in the third control portion 90 is performed by the CPU 91 (the second position acquisition portion 94) when the third control portion 90 is activated. The position acquisition processing in the first control portion 40 is performed by the CPU 41 (the first position acquisition portion 45) when the activation processing of the carriage 34 is completed. The position acquisition processing in the first control portion 40 shown in FIG. 7 includes step S61 to step S69 shown in FIG. 6, except step S65 and step S67. Hereinafter, the position acquisition processing that is performed by each of the first control portion 40, the second control portion 70 and the third control portion 90 will be explained using an example in which the position acquisition processing is performed by the second control portion 70, and an explanation of a case in which the position acquisition processing is performed by the first control portion 40 and the third control portion 90 is omitted. Note that the first position acquisition portion 45 stores data representing the current position of the carriage 34 in a register of the CPU 41. Similarly, the second position acquisition portions 76 and 94 respectively store data representing the current position of the carriage 34 in registers of the CPU 71 and the CPU 91. It is assumed that, when the processing is started, the initial position is set to the current position of the carriage 34 of each of the first position acquisition portion 45 and the second position acquisition portions 76 and 94.

As shown in FIG. 6, the CPU 71 determines whether or not a detection signal has been acquired from the encoder 82 (step S61). When the detection signal has been acquired from the encoder 82 (yes at step S61), the CPU 71 updates the current position of the carriage 34, and stores the updated current position in the register of the CPU 71 (step S63). When the detection signal has not been acquired (no at step S61), the CPU 71 determines whether or not the reference position has been received (step S65). The reference position is output from the CPU 41 by the processing at step S1 shown in FIG. 4. When the reference position has been acquired (yes at step S65), the current position of the carriage 34 stored in the register is replaced with the reference position (step S67). When the reference position has not been received (no at step S65), or when the position acquisition processing is not terminated after step S67 (no at step S69), the processing returns to step S61. The position acquisition processing is terminated, for example, when the main power supply portion 81 is turned off. When the position acquisition processing is terminated (yes at step S69), the position acquisition processing ends.

Figure 8:
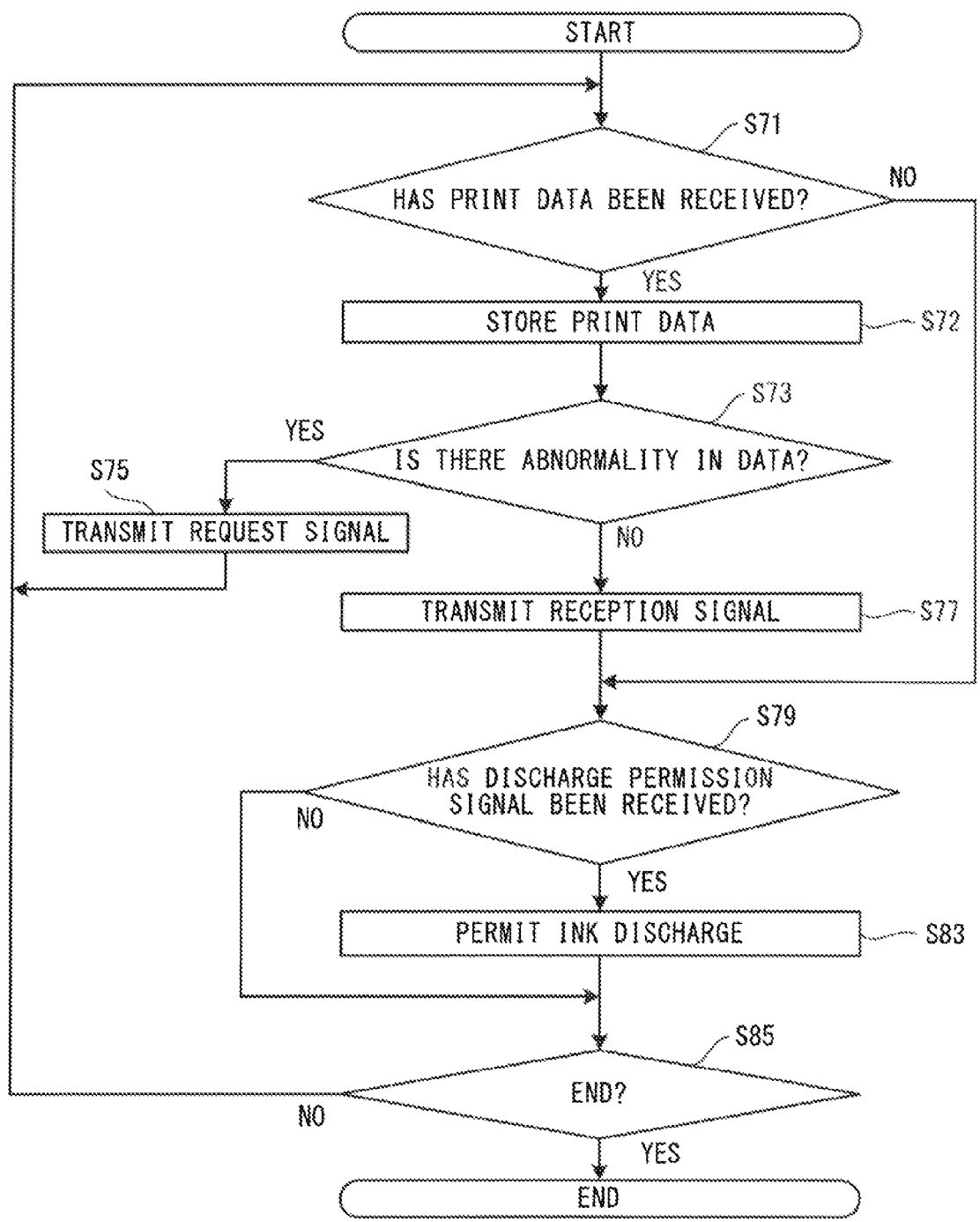
FIG. 8 is an explanatory diagram of print data reception processing.

Next, the print data reception processing that is performed by the second control portion 70 and the third control portion 90 will be explained with reference to FIG. 8. The print data reception processing shown in FIG. 8 is included in the processing at step S7 shown in FIG. 4 that is performed by the CPU 41, the CPU 71 and the CPU 91 operating in cooperation with each other, and is part of the processing that is performed by the CPU 71 and the CPU 91. More specifically, in the print data reception processing shown in FIG. 8, the CPU 71 and the CPU 91 perform processing that receives the print data and the discharge permission signal output from the CPU 41 in the print data output processing shown in FIG. 5. The print data reception processing in the second control portion 70 is started when the second control portion 70 receives the print data from the CPU 41, and is performed by the CPU 71 in accordance with the printing control program stored in the ROM 84. The print data reception processing in the third control portion 90 is started when the third control portion 90 receives the print data from the CPU 41, and is performed by the CPU 91 in accordance with the printing control program stored in the ROM 87. The print data reception processing in the second control portion 70 and the print data reception processing in the third control portion 90 are basically the same processing. Therefore, a case in which the print data reception processing is performed in the second control portion 70 will be explained, and an explanation of a case in which the print data reception processing is performed in the third control portion 90 will be omitted.

Figure 9:
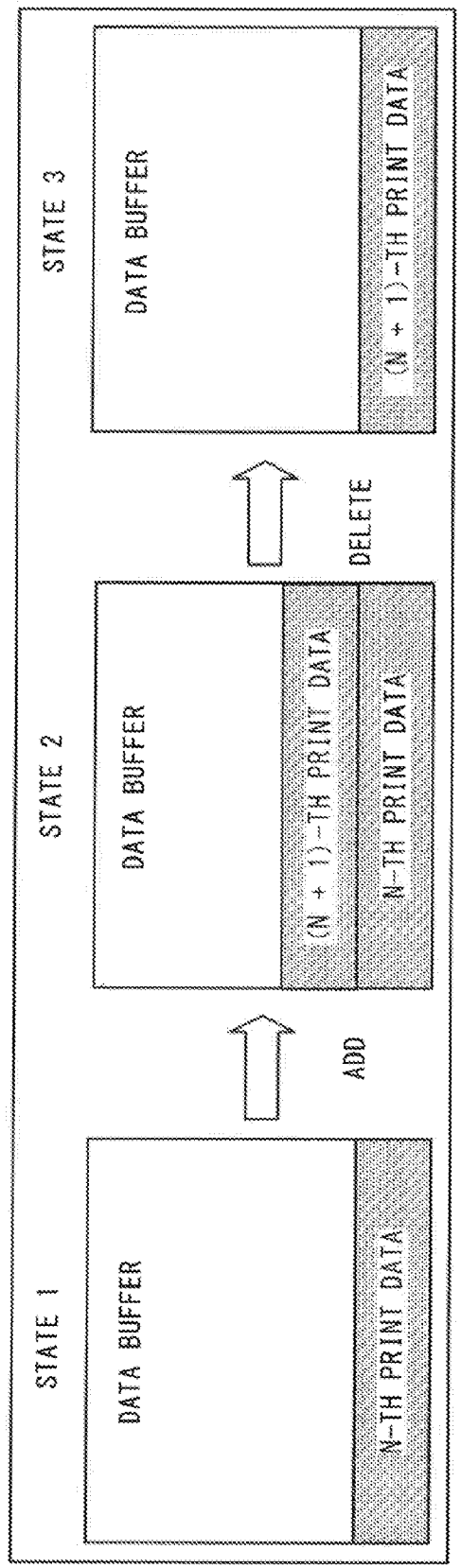
FIG. 9 is an explanatory diagram of processing that temporarily stores the print data in a data buffer.

As shown in FIG. 8, the CPU 71 determines whether or not the print data output by the CPU 41 has been received (step S71). When the print data has not been received (no at step S71), processing at step S79 that will be described later is performed. When the print data has been received (yes at step S71), the CPU 71 stores in the RAM 85 the print data received in the processing at step S71 and an integrated value of data sizes of the print data received so far (step S72). The RAM 85 functions as a data buffer to store the print data, and can store a predetermined amount of print data in the printing order, as shown in FIG. 9. As shown by State 1 in FIG. 9, when the (N+1)-th print data is newly received in a state in which the N-th print data is stored in the data buffer, the (N+1)-th print data is added to the data buffer, as shown by State 2 in FIG. 9. Next, the CPU 71 determines whether or not there is an abnormality in the print data (step S73). Whether or not there is an abnormality in the print data is determined, for example, by using an error check bit that is used in a known USB protocol. The value included in the error check bit is calculated using a cyclic redundancy check (CRC) algorithm. It is needless to mention that, separately from the error check bit used in the USB protocol, error checking data may be included in a packet that is used to output the print data, and the error checking data may be used to determine whether or not there is an abnormality in the print data.

When there is an abnormality in the print data (yes at step S73), the CPU 71 transmits a request signal to the CPU 41 via the USB hub 61 (step S75). The request signal includes data indicating that this signal is a request signal and data indicating that the transmission source of the request signal is the second control portion 70. Next, the processing returns to step S71. The print data in which the abnormality is found is deleted from the data buffer. When no abnormality is found in the print data (no at step S73), the CPU 71 transmits a reception signal to the CPU 41 via the USB hub 61 (step S77). The reception signal includes data indicating that this signal is a reception signal and data indicating that the transmission source of the reception signal is the second control portion 70.

Next, the CPU 71 determines whether or not the discharge permission signal has been received via the first signal line 121 (step S79). When the discharge permission signal has been received (yes at step S79), the CPU 71 (the first discharge control portion 78) permits the start of the processing that discharges ink in accordance with the print data acquired at step S71 (step S83). Based on the processing at step S83, the CPU 71 controls the first discharge drive portion 74 in the processing at step S7 in FIG. 4, and permits execution of the processing that discharges a discharge amount of ink corresponding to the current position of the carriage 34 in accordance with the print data. As described above, in the discharge processing that is performed separately from the print data reception processing, each of the CPU 71 (the first discharge control portion 78) and the CPU 91 (the second discharge control portion 95) performs the processing that discharges ink based on the print data for which the discharge permission signal has been received and on the current position of the carriage 34. Note that the print data for which the discharge processing is completed at step S7 in FIG. 4 is deleted from the data buffer. For example, in a state in which the N-th print data and the (N−1)-th print data are stored in the data buffer as shown by State 2 in FIG. 9, when the discharge processing based on the N-th print data is completed, the N-th print data is deleted from the data buffer as shown by State 3 in FIG. 9.

When the discharge permission signal has not been received (no at step S79), or after step S83, the CPU 71 determines whether or not to end the printing (step S85). Whether or not to end the printing is determined, for example, by comparing the integrated value of the data sizes of the print data stored in the RAM 85 with a data size of all the print data added to first print data. When the print processing is not terminated (no at step S85), the processing returns to step S71. When the print processing based on the print data is terminated (yes at step S85), the print data reception processing ends.

With the printer 30 of the above-described embodiment, after starting the output of the specified print data to the second control portion 70 or to the third control portion 90, the first control portion 40 outputs the subsequent print data. When the N-th print data that is processed in the same period is received properly by each of the plurality of discharge control portions 78 and 95, the (N+1)-th print data is output. When the N-th print data that is processed in the same period is not received properly by each of the plurality of discharge control portions 78 and 95, the N-th print data is output again as the subsequent print data. By doing this, each of the discharge control portions 78 and 95 appropriately receives the print data, and the processing that discharges liquid based on the print data after a printable state is achieved is more likely to be performed. Further, there is a higher possibility that all the plurality of discharge control portions 78 and 95 will complete the reception of the print data, which is used to discharge liquid in the same period, before the start of the processing that discharges liquid based on the print data. Therefore, the printer 30 avoids a situation in which the printing is started regardless of the fact that at least one of the plurality of discharge control portions has not completed the reception of the print data or is not able to perform printing based on the received print data. Therefore, the printer 30 inhibits the print processing, which is based on the premise that ink is discharged simultaneously, from not being performed appropriately, and it is thus possible to inhibit deterioration of the print quality.

More specifically, after the reception signal has been received from all the discharge control portions 78 and 95, the control data output portion 47 outputs the discharge permission signal and next print data. Therefore, in comparison to a case in which the subsequent print data is output without taking account of a reception status of the print data by each of the plurality of discharge control portions 78 and 95, the printer 30 is more likely to complete the reception of the print data, which is used to discharge liquid in the same period, before the start of the processing that discharges liquid based on the print data. Further, in the printer 30, the discharge permission signal is output, via the signal lines 121 and 122, to the discharge control portions 78 and 95 that are connected to the control data output portion 47 via the USB hub 61, and is received without delay. Thus, after receiving the discharge permission signal, the discharge control portions 78 and 95 that are connected to the control data output portion 47 via the USB hub 61 perform the processing that discharges liquid based on the print data. Therefore, there is a higher possibility that all the plurality of discharge control portions 78 and 95 will complete the reception of the print data, which is used to discharge liquid in the same period, before the start of the processing that discharges liquid based on the print data. Even in a case in which the white ink for pretreatment and the color ink for post-treatment are discharged from the different discharge port groups 361 under the control of the respective discharge control portions 78 and 95, there is a higher possibility that all the plurality of discharge control portions 78 and 95 will complete the reception of the print data, which is used to discharge liquid in the same period, before the start of the processing that discharges liquid based on the print data. Therefore, in the printer 30, even when the control data output portion 47 and the plurality of discharge control portions 78 and 95 are connected via the USB hub 61, which is a connection device, it is possible to suppress the print quality from deteriorating due to a timing difference in the reception of the print data between the plurality of discharge control portions 78 and 95.

With the printer 30, before starting the discharge processing, processing is performed to match the values of the carriage 34 that are respectively stored in the second position acquisition portions 76 and 94. Thus, the printer 30 can prevent the ink from not being discharged to an appropriate position due to an error occurring when the current position of the carriage 34 with respect to the print medium is acquired. The first control portion 40 performs control to output the print data to the discharge control portions 78 and 95 and performs control to move the platen 39 (the print medium). In the printer 30, the processing that divides and outputs the print data a plurality of times is performed in parallel with the feed control of the carriage 34 and the feed control of the print medium. Since the processing during printing is divided between and performed by the first control portion 40 and the second control portion 70, it is possible to reduce a load during printing that is imposed on each of the control portions, in comparison to a case in which all the processing is performed by one control portion.

The printer of the present disclosure is not limited to the above-described embodiment, and various modifications may be made within the scope and spirit of the present disclosure. For example, the following modifications (A) to (G) may be made as appropriate.

(A) The configuration of the printer 30 may be changed as appropriate. For example, the following modifications (A-1) to (A-3) may be made.

(A-1) It is sufficient that the liquid that can be discharged by the discharge ports is a liquid having a property, such as viscosity, that allows the liquid to be discharged by the discharge ports. Therefore, the liquid is not limited to ink and may be a chemical agent, such as a decolorant, for example. The number of the discharge port groups and the discharge control portions may be changed as appropriate. All the plurality of discharge control portions need not necessarily be connected to the control data output portion via a connection device, such as the USB hub. More specifically, at least one of the discharge control portions may be connected to the control data output portion without going through the connection device. The number of the discharge port groups included in one discharge unit may be one or more.

Figure 10:
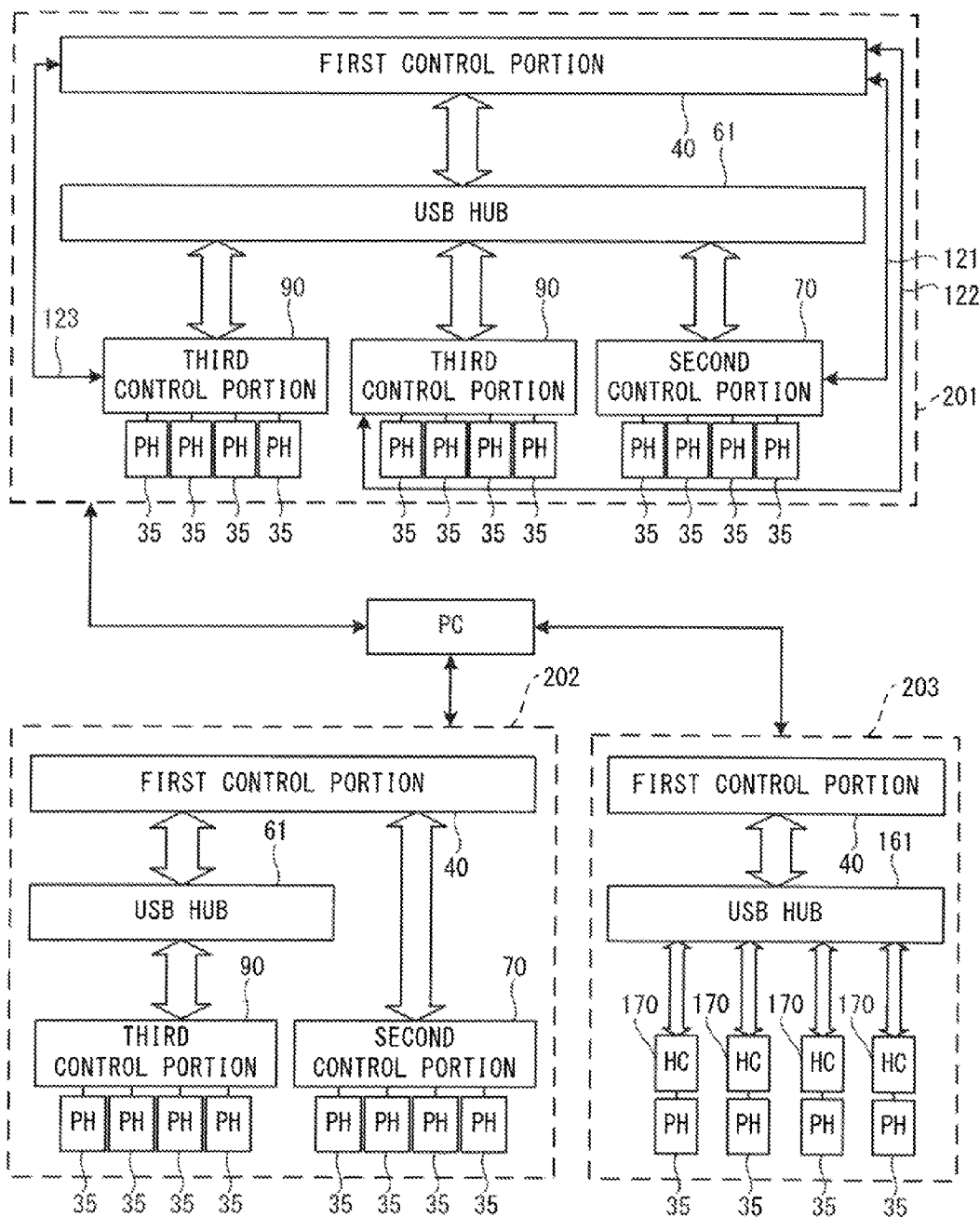
FIG. 10 is a schematic block diagram showing an electrical configuration of printers 201 to 203 according to a modified example.

Modified examples of the print heads and the discharge control portions included in the printer will be explained, using printers 201 to 203 shown in FIG. 10 as examples. In the printer 201, the first control portion 40, the second control portion 70 and the third control portion 90 are connected via the USB hub 61. In addition to the configuration of the printer 30 of the above-described embodiment, the printer 201 additionally includes one more of the third control portion 90. The added third control portion 90 and the first control portion 40 are directly connected by a signal line 123. It is preferable that the discharge control portion that is connected in this way to the first control portion 40 (the control data output portion 47) via a connection device, such as the USB hub 61, is connected to the control data output portion 47 by a signal line. However, the signal line can be omitted, if necessary. When only one or some of the discharge control portions that are connected to the first control portion (the control data output portion) are connected to the control data output portion by the signal line, it is preferable to set an order of outputting the print data in the following manner. That is, the output of the print data to the discharge control portion that is not connected to the control data output portion by the signal line is set to be performed after the output of the discharge control portion that is connected to the control data output portion by the signal line. In this case, by adjusting the transmission timing of the discharge permission signal to the discharge control portion that has received the print data earlier, it is possible to suppress the print quality from deteriorating due to a time lag of the print data reception with the discharge control portion that receives the print data at a later time. The printer 202 has a configuration in which the first control portion 40 and the second control portion 70 are connected without going through the USB hub 61, and the first control portion 40 and the third control portion 90 are connected via the USB hub 61. In the printer 203, the print heads (PH) 35 are connected one-to-one with discharge control portions (HC) 170, and each of the discharge control portions (HC) 170 is connected via a USB hub 161.

Figure 11:
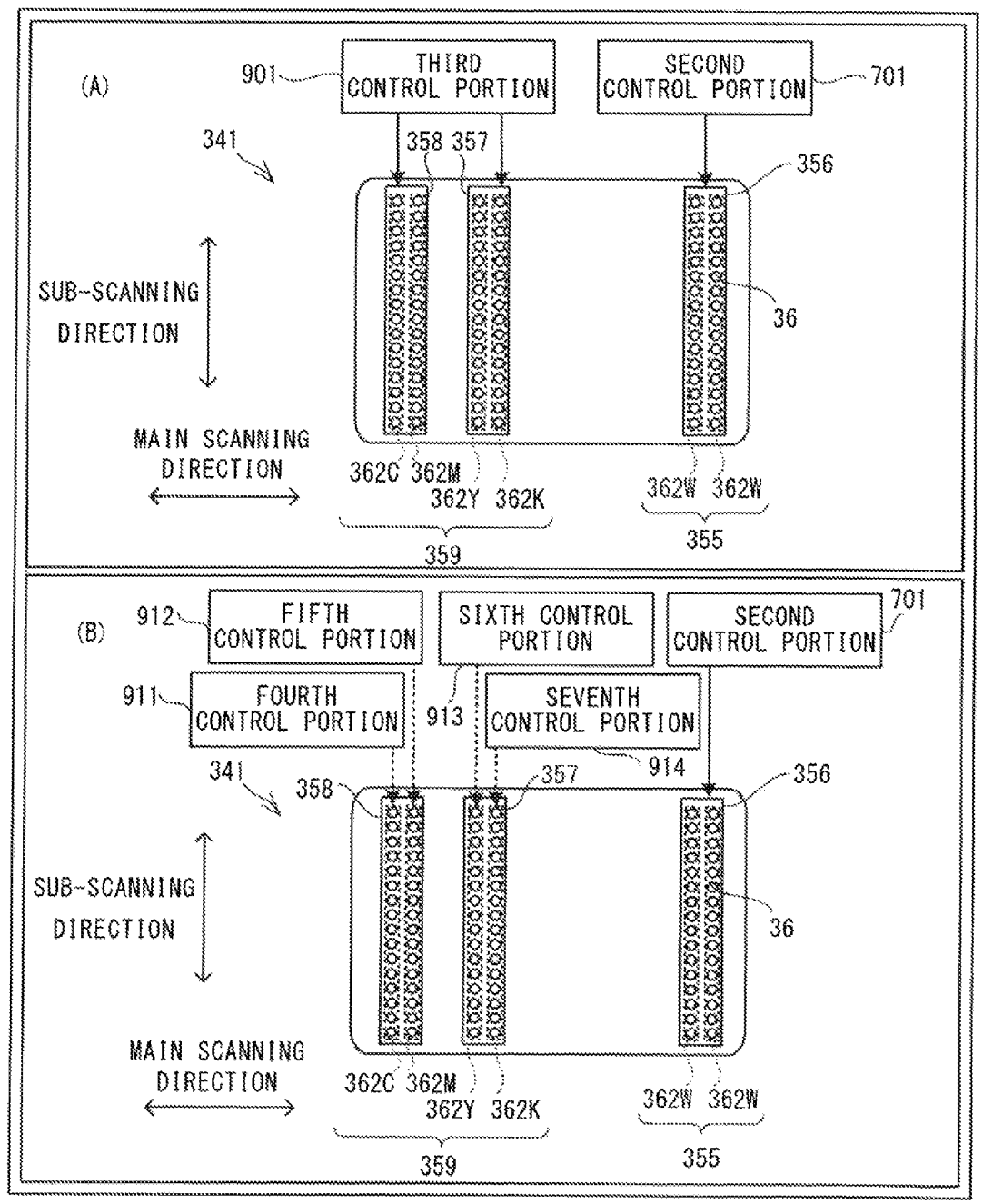
FIG. 11 is an explanatory diagram of a schematic configuration of a carriage 341 according to a modified example.

Print heads and discharge port groups mounted on a carriage according to a modified example will be explained with reference to FIG. 11. As shown in FIG. 11 (A), a carriage 341 of the modified example is provided with print heads 356, 357 and 358. The print heads 357 and 358 are arranged in positions separated from the print head 356 such that the print heads 357 and 358 face the print head 356 in the main scanning direction. The plurality of discharge ports 36 provided on the print heads 356, 357 and 358 are grouped into a first unit 355 and a second unit 359. The first unit 355 is provided with two discharge port groups 362W that discharge a white ink for pretreatment. The two discharge port groups 362W are provided on a bottom surface of the print head 356. The two discharge port groups 362W are arranged side by side in the main scanning direction. The second unit 359 is provided with four discharge port groups 362C, 362M, 362Y and 362K that each discharge color ink for post-treatment. The two discharge port groups 362C and 362M are provided on a bottom surface of the print head 358, and the two discharge port groups 362Y and 362K are provided on a bottom surface of the print head 357. The discharge port group 362C discharges cyan ink. The discharge port group 362M discharges magenta ink. The discharge port group 362Y discharges yellow ink. The discharge port group 362K discharges black ink. For example, the first unit 355 is controlled by a second control portion 701 that is provided with a first discharge control portion, and the second unit 359 is controlled by a third control portion 901 that is provided with a second discharge control portion.

As shown in the modified example shown in FIG. 11, one print head may include a plurality of discharge port groups. The number of the discharge port groups controlled by one discharge control portion may be one or more. Therefore, when a plurality of the discharge port groups are provided on one print head, each of the discharge port groups may be controlled by the same discharge control portion, or may be controlled by the discharge control portions that are different from each other. More specifically, in the carriage 341 that is similar to that shown in FIG. 11 (A), the discharge port group 362C and the discharge port group 362M that are provided on the single print head 358 may be respectively controlled by a fourth control portion 911 that is provided with a fourth discharge control portion and by a fifth control portion 912 that is provided with a fifth discharge control portion, as shown in FIG. 11 (B). Further, the discharge port group 362Y and the discharge port group 362K that are provided on the single print head 357 may be respectively controlled by a sixth control portion 913 that is provided with a sixth discharge control portion and by a seventh control portion 914 that is provided with a seventh discharge control portion. When the single print head includes a plurality of the discharge port groups, the arrangement of the respective discharge port groups is not limited to the example in which the discharge port groups are arranged side by side in the main scanning direction, and may be changed as appropriate. When a plurality of the discharge units are provided, the arrangement of the respective discharge units on the carriage 341 may be changed as appropriate.

(A-2) It is sufficient that the connection device, which connects a control data output portion and a discharge control portion, includes a first connection port that can be connected to the control data output portion, and a plurality of second connection ports that can be individually connected to the first connection port such that data transmission is possible, and the connection device is not limited to the USB hub 61. For example, an Ethernet (registered trademark) hub may be used. From a view point of data transmission efficiency, it is preferable that the connection device has a switching function. However, the connection device need not necessarily have the switching function. The printer may be provided with a plurality of types of connection devices. In this case, the respective discharge control portions may be connected to the control data output portion via the different connection devices.

(A-3) The first position acquisition portion 45 may be provided on an integrated circuit, such as a field-programmable gate array (FPGA) that is electrically connected to the CPU 41. In a similar manner, the second position acquisition portions 76 and 94 may be provided on integrated circuits, such as FPGAs that are electrically connected to the CPU 71 and the CPU 91, respectively.

(B) The data included in the reception signal and the processing relating to the reception signal may be changed as appropriate. For example, the reception signal may be transmitted to the control data output portion 47 via a connection device, such as the USB hub 61, or may be transmitted via a signal line. As another example, the following modification (B-1) or (B-2) may be made. After receiving the discharge permission signal, each of the discharge control portions starts the processing that discharges ink based on the print data transmitted from the CPU 41. Therefore, even when the modification (B-1) or (B-2) is made, it is possible to avoid a situation in which the discharge processing is performed in one of the discharge control portions regardless of the fact that the print data has not been received in the other discharge control portion.

(B-1) A case in which the print data is re-transmitted to all the discharge control portions when the reception signal is not received When the reception signal is not received from one of the discharge control portions, the processing at step S39 in FIG. 5 may be omitted and the N-th print data may be re-transmitted to all the discharge control portions. In this case, the reception signal need not necessarily include the data indicating the transmission source. When the discharge control portion on the reception side receives the print data that need not be received again, it may delete the print data or may delete data that is duplicated in the once more received print data.

(B-2) A case in which the discharge control portion does not transmit the reception signal Further, each of the CPU 71 and the CPU 91 may omit the processing at step S77 in FIG. 8, namely, the processing that transmits the reception signal to the CPU 41 when the print data is received. In this case, the processing from step S35 to step S43 in FIG. 5 may be omitted and the CPU 41 may transmit the discharge permission signal to the discharge control portion at a predetermined timing after transmitting the print data (for example, when a predetermined time has elapsed after outputting the print data) to the discharge control portion. In this case, after step S33, each of the CPU 71 and the CPU 91 may perform the processing at step S37.

(C) The data included in the request signal and the processing relating to the request signal may be changed as appropriate. For example, the request signal may be transmitted to the control data output portion 47 via a connection device, such as the USB hub 61, or may be transmitted via a signal line. As another example, the following modification (C-1) or (C-2) may be made. After receiving the discharge permission signal, each of the discharge control portions starts the processing that discharges ink based on the print data transmitted from the CPU 41. Therefore, even when the modification (C-1) or (C-2) is made, it is possible to avoid a situation in which the discharge processing is performed in one of the discharge control portions regardless of the fact that the print data has not been received in the other discharge control portion.

(C-1) A case in which the print data is re-transmitted to all the discharge control portions when the request signal is received When the request signal is received from one of the discharge control portions, the processing at step S29 in FIG. 5 may be omitted and the N-th print data may be re-transmitted to all the discharge control portions. In this case, the request signal need not necessarily include the data indicating the transmission source. When the discharge control portion on the reception side receives the print data that need not be received again, it may delete the print data or may delete data that is duplicated in the once more received print data.

(C-2) A case in which the discharge control Portion does not transmit the request signal When it is not assumed that the print data may be corrupted, each of the CPU 71 and the CPU 91 may omit the processing at step S73 and the processing at step S75 in FIG. 8, namely, the processing that determines whether or not there is an abnormality in the received print data and the processing that transmits the request signal when there is an abnormality. In this case, the processing from step S29 to step S33 in FIG. 5 may be omitted and the CPU 41 may output the discharge permission signal to the discharge control portion at a predetermined timing after outputting the print data (for example, when a predetermined time has elapsed after outputting the print data) to the discharge control portion. In this case, after step S33, each of the CPU 71 and the CPU 91 may perform the processing at step S37.

(D) In the print data output processing shown in FIG. 5, the processing that limits the number of times of retransmission of the print data may be changed as appropriate. For example, the constant L is not limited to 5 as exemplified in the above-described embodiment, and may be changed as appropriate. Further, the processing that counts the number of times of retransmission may be changed as appropriate. More specifically, although the number of times of retransmission is counted at both step S33 and step S43 in the above-described embodiment, the number of times of retransmission may be counted at only one of step S33 and step S43. Further, without limiting the number of times of retransmission, the processing that re-transmits the N-th print data may be performed depending on a reception status of at least one of the request signal and the reception signal. Further, the processing that re-transmits the print data may be performed regardless of the reception status of the request signal and the reception signal. In the printer in this case, if the N-th print data is output a plurality of times, there is an increased possibility that the N-th print data will be appropriately received in each of the discharge control portions. Therefore, it is possible to suppress the print quality from deteriorating due to a reception timing difference between the plurality of discharge control portions.

(E) The program that includes instructions that cause the printer 30 to perform the print processing in FIG. 4, the print data output processing in FIG. 5, the position acquisition processing in FIG. 6 and FIG. 7 and the print data reception processing in FIG. 8 may be stored in the storage device provided in the printer 30 until the printer 30 performs the program. Therefore, the acquisition method and the acquisition route of the program and the respective devices that store the program may be changed as appropriate. Therefore, the program executed by the processor provided in the printer 30 may be received from another device, via a cable or via wireless communication, and stored in a storage device, such as a flash memory. Examples of the other device include a PC and a server that is connected via a network.

(F) The respective steps of the print processing in FIG. 4, the print data output processing in FIG. 5, the position acquisition processing in FIG. 6 and FIG. 7 and the print data reception processing in FIG. 8 are not limited to the examples performed by the CPU 41, the CPU 71 and the CPU 91, and part or all of the steps may be performed by another electronic device (an application-specific integrated circuit (ASIC), for example). Further, the above-described respective steps may be distributed and processed by a plurality of electronic devices (a plurality of CPUs, or a combination of at least one CPU and at least one ASIC, for example). Further, a case in which an operating system (OS) or the like that is operating on the printer 30 performs part or all of actual processing based on an instruction from the CPU provided in the printer 30 and the functions of the above-described embodiment are realized by the processing, is also included in the scope of the present disclosure.

(G) In the respective steps of the processing of the above-described embodiment, an order change, omission of the step and addition of a step are possible, if necessary. For example, one of Pattern 1 to Pattern 24 may be adopted which are shown in a chart in FIG. 12 and to which the above-described modifications (B), (C) and (D) are appropriately made. In FIG. 12, "B: PROCESSING AT S31" corresponds to the processing relating to the request signal of the above-described modified example (B). More specifically, "IDENTIFIED" indicates the case in which the processing at step S27, step S29 and step S31 is performed as described in the above-described embodiment. "ALL" corresponds to the case of the modified example (B-1). "NONE" corresponds to the case of the above-described modified example (B-2). In FIG. 12, "C: PROCESSING AT S41" corresponds to the processing relating the reception signal of the above-described modified example (C). More specifically, "IDENTIFIED" indicates the case in which the processing at step S35, step S39 and step S41 is performed as described in the above-described embodiment. "ALL" corresponds to the case of the modified example (C-1). "NONE" corresponds to the case of the above-described modified example (C-2). In FIG. 12, "D: COUNT OF M" corresponds to the processing relating to the limitation of the number of times of retransmission of the above-described modified example (D). Specifically, "BOTH PROCESSING AT S33 AND PROCESSING AT S43" indicates the case in which the processing at step S33, step S43 and step S37 is performed as described in the embodiment. "ONLY PROCESSING AT S33" indicates the case in which step S43 is omitted and the processing at step S33 and step S37 is performed. "ONLY PROCESSING AT S43" indicates the case in which step S33 is omitted and the processing at step S43 and step S37 is performed. "NO COUNT indicates the case in which the processing at step S33, step S43 and step S37 is omitted. The above-described embodiment corresponds to pattern 1.

Further, for example, when the time period from when each of the discharge control portions receives the print data to when the discharge processing is performed based on the received print data is sufficiently secured, the output of the discharge permission signal may be omitted. As another example, the discharge permission signal and the print data that is output each time need not necessarily have a one-to-one correspondence with each other. More specifically, for example, one discharge permission signal may be output with respect to the print data that is output sequentially a plurality of times (three times, for example). As another example, when the print data output each time is print data corresponding to three lines, the discharge permission signal may be output for each line. If the timing at which the discharge permission signal is output is adjusted while taking into consideration a time period from when the control data output portion 47 outputs the print data to when each of the discharge control portions receives the print data, it is possible to inhibit deterioration of the print quality while performing the print processing quickly.

What is claimed is:

1. A printer comprising:
a plurality of discharge control devices that are configured to be connected to at least one of a plurality of discharge port groups having a plurality of discharge ports capable of discharging liquid, and to control discharge of the liquid by the connected discharge port group based on print data, the print data being data to discharge the liquid by the connected discharge port group;
a control data output device that is configured to output the print data to each of the discharge control devices;
a connection device that includes a first connection port capable of connecting to the control data output device and a plurality of second connection ports that are capable of individually connecting to the at least one of the plurality of discharge port groups and that are capable of individually connecting to the first connection port such that data transmission is possible;
a connection control device that is configured to control data transmission between the first connection port and the plurality of second connection ports;
a processor; and
a memory configured to store computer-readable instructions, wherein the computer-readable instructions cause the processor to perform processes comprising:
starting output of specified print data from the control data output device, via a connection device controlled by a connection control device, to a specified discharge control device which is one of the plurality of discharge control devices that are each connected to one of the plurality of second connection ports and which is a target to perform processing that outputs print data, the specified print data being the print data to discharge the liquid by the discharge port group connected to the specified discharge control device; and
outputting subsequent print data from the control data output device, via the connection device, to the specified discharge control device that is connected to the second connection port, the subsequent print data being data relating to a specified discharge target onto which the liquid is to be discharged by the discharge port group connected to the specified discharge control device, based on the specified print data for which output has been started.

2. The printer according to claim 1, wherein
the outputting of the subsequent print data from the control data output device is caused by completion of the output of the print data, which is used to discharge the liquid in a same period, to all the discharge control devices that control the discharge port groups that discharge the liquid in the same period, among the plurality of discharge port groups.

3. The printer according to claim 1, wherein
the outputting of the subsequent print data from the control data output device is once more outputting, as the subsequent print data, the specified print data to the same specified discharge control device, depending on a reception status of the specified print data by the specified discharge control device.

4. The printer according to claim 1, further comprising:
a signal line that directly connecting the control data output device and the discharge control device that is connected to the control data output device via the connection device,
wherein
the computer-readable instructions further cause the processor to perform a process comprising:
outputting, after the outputting of the specified print data from the control data output device to the specified discharge control device, a discharge permission signal from the control data output device to the specified discharge control device via a signal line, the discharge permission signal being a signal that permits start of discharge processing, which is processing that discharges the liquid based on the specified print data, and
causing the discharge control device connected to the control data output device via the signal line to perform the processing that discharges the liquid based on the specified print data, after receiving the specified print data and the discharge permission signal corresponding to the specified print data.

5. The printer according to claim 1, further comprising:
a first unit that includes at least one of the discharge port groups that discharges a first type of liquid, which is the liquid for pretreatment;
a second unit that includes at least one of the discharge port groups which is different from the discharge port group of the first unit and which discharges a second type of liquid, which is the liquid for post-treatment that is performed after the pretreatment;
a first signal line that directly connects the control data output device and a first discharge control device, the first discharge control device being included in the plurality of discharge control devices, being connected to one of the plurality of second connection ports, and causing the discharge port group of the first unit to discharge the first type of liquid based on the discharge permission signal output from the control data output device; and
a second signal line that directly connects the control data output device and a second discharge control device, the second discharge control device being included in the plurality of discharge control devices, being connected to one of the plurality of second connection ports, and causing the discharge port group of the second unit to discharge the second type of liquid based on the discharge permission signal output from the control data output device;
wherein
the computer-readable instructions further cause the processor to perform a process comprising:
outputting, after the specified print data is output using each of the first discharge control device and the second discharge control device as the specified discharge control device, a discharge permission signal to each of the first discharge control device and the second discharge control device via a first signal line and a second signal line, the discharge permission signal being a signal that permits start of discharge processing, which is processing that discharges the liquid based on the print data,
causing the first discharge control device to perform processing that discharges the first type of liquid based on the specified print data, after the discharge permission signal has been received, and causing the second discharge control device to perform processing that discharges the second type of liquid based on the specified print data, after the discharge permission signal has been received.

6. The printer according to claim 1, further comprising:
a carriage that supports the plurality of discharge port groups;
a feed device that is configured to move relatively a carriage that supports the plurality of discharge port groups with respect to the print medium;
a feed control device that is configured to control the feed device;
a first position acquisition device that is configured to acquire individually the relative position of a carriage, with respect to a print medium; and
a second position acquisition device that is configured to acquire individually the relative position of a carriage, with respect to a print medium;
wherein
the computer-readable instructions further cause the processor to perform a process comprising:
outputting a relative position, as a reference position used as a reference for the relative position, from the control data output device to the second position acquisition device that is connected to one of the plurality of second connection ports, the relative position being acquired by the first position acquisition device and being acquired before at least one of the plurality of discharge port groups starts processing that discharges the liquid based on the print data;
updating a current relative position by the second position acquisition device based on the reference position output from the feed device; and
causing the discharge control device that is connected to one of the plurality of second connection ports to perform processing that discharges the liquid based on the relative position acquired by the second position acquisition device and on the print data.

7. The printer according to claim 1, further comprising:
a first feed device that is configured to moves a carriage that supports the plurality of discharge port groups;
a first feed control device that is configured to control the first feed device;
a second feed device that is configured to moves a platen on which a fabric is placed;
a second feed control device that is configured to control the second feed device;
a first control portion that includes the control data output device and the second feed control device, and that is connected to the first connection port; and
a second control portion that includes the discharge control device and a first feed control device, and that is connected to one of the plurality of second connection ports.

8. A non-transitory computer-readable medium storing computer readable instructions that, when executed, cause a printer to perform processes comprising:
starting output of specified print data from a control data output device, via a connection device controlled by a connection control device, to a specified discharge control device which is one of a plurality of discharge control devices that are each connected to one of a plurality of second connection ports and which is a target to perform processing that outputs print data, the plurality of discharge control devices being connected to at least one of a plurality of discharge port groups having a plurality of discharge ports capable of discharging liquid, and controlling discharge of the liquid by the connected discharge port group based on the print data, the control data output device outputting the print data to each of the discharge control devices, the print data being data to discharge the liquid by the connected discharge port group, the specified print data being the print data to discharge the liquid by the discharge port group connected to the specified discharge control device, the connection device including a first connection port capable of connecting to the control data output device and the plurality of second connection ports that are capable of individually connecting to the at least one of the plurality of discharge port groups and that are capable of individually connecting to the first connection port such that data transmission is possible, and the connection control device controlling data transmission between the first connection port and the plurality of second connection ports; and
outputting subsequent print data from the control data output device, via the connection device, to the specified discharge control device that is connected to the second connection port, the subsequent print data being data relating to a specified discharge target onto which the liquid is to be discharged by the discharge port group connected to the specified discharge control device, based on the specified print data for which output has been started.

* * * * *